US012506910B2

United States Patent
Ouedraogo et al.

(10) Patent No.: US 12,506,910 B2
(45) Date of Patent: Dec. 23, 2025

(54) METHOD AND APPARATUS FOR ENCAPSULATING UNCOMPRESSED IMAGES AND UNCOMPRESSED VIDEO DATA INTO A FILE

(71) Applicant: CANON KABUSHIKI KAISHA, Tokyo (JP)

(72) Inventors: Naël Ouedraogo, Val d'Anast (FR); Franck Denoual, Saint Domineuc (FR); Frédéric Maze, Langan (FR); Hervé Ruellan, Rennes (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/260,523

(22) PCT Filed: Jan. 3, 2022

(86) PCT No.: PCT/EP2022/050035
§ 371 (c)(1),
(2) Date: Jul. 6, 2023

(87) PCT Pub. No.: WO2022/148729
PCT Pub. Date: Jul. 14, 2022

(65) Prior Publication Data
US 2024/0064349 A1 Feb. 22, 2024

(30) Foreign Application Priority Data

Jan. 6, 2021 (GB) ...................................... 2100151
Jun. 29, 2021 (GB) ...................................... 2109380
(Continued)

(51) Int. Cl.
*H04N 21/235* (2011.01)
*H04N 21/845* (2011.01)

(52) U.S. Cl.
CPC ..... *H04N 21/2353* (2013.01); *H04N 21/8458* (2013.01)

(58) Field of Classification Search
None
See application file for complete search history.

(56) References Cited

U.S. PATENT DOCUMENTS 9,661,294 B2 * 5/2017 Oh ........................... G09G 5/04
9,769,230 B2 * 9/2017 Hannuksela ..... H04N 21/85406
(Continued)

FOREIGN PATENT DOCUMENTS

WO 2020/196006 A1 10/2020

OTHER PUBLICATIONS

Jean Le Feuvre, Storage of Raw Video in ISOBMFF, International Organisation for Standardisation, ISO/IEC JTC 1/SC 29/WG 3, Coding of Moving Pictures and Audio, Oct. 2020, Online, Doc. No. m55059, XP30292574A.
(Continued)

*Primary Examiner* — An Son P Huynh
(74) *Attorney, Agent, or Firm* — Canon U.S.A., Inc. IP Division

(57) ABSTRACT

The present invention concerns a method of encapsulating one or more uncompressed images in a media file, wherein the method comprises: generating generic description information describing the images and indicating that the images are uncompressed; and encapsulating the generic description information and the one or more images in the media file, the uncompressed images being encapsulated as one or more image items, the generic description information being encapsulated in a metadata part of the media file describing the image items.

21 Claims, 12 Drawing Sheets

(30) Foreign Application Priority Data

Sep. 28, 2021 (GB) .................................... 2113868
Nov. 5, 2021 (GB) .................................... 2115960

(56) References Cited

U.S. PATENT DOCUMENTS

| | | | | |
|---|---|---|---|---|
| 10,455,260 | B2* | 10/2019 | Iguchi | H04L 65/80 |
| 10,917,186 | B2* | 2/2021 | Yang | H04L 65/65 |
| 11,315,581 | B1* | 4/2022 | Joshi | G10L 21/02 |
| 2007/0115871 | A1* | 5/2007 | Zhang | H04W 52/346 |
| | | | | 370/318 |
| 2008/0232580 | A1* | 9/2008 | Hosaka | H04L 9/085 |
| | | | | 380/28 |
| 2008/0285643 | A1* | 11/2008 | Diab | H04N 21/43632 |
| | | | | 370/357 |
| 2009/0060463 | A1* | 3/2009 | Nishio | H04N 19/172 |
| | | | | 386/353 |
| 2009/0290632 | A1* | 11/2009 | Wegener | H03M 7/30 |
| | | | | 375/240 |
| 2012/0023249 | A1* | 1/2012 | Chen | H04N 21/2381 |
| | | | | 709/231 |
| 2012/0051441 | A1* | 3/2012 | Kim | H04N 21/236 |
| | | | | 375/240.26 |
| 2015/0172783 | A1* | 6/2015 | Kim | H04N 21/43074 |
| | | | | 725/110 |
| 2016/0044339 | A1* | 2/2016 | Sung | H04N 19/91 |
| | | | | 375/240.23 |
| 2016/0124645 | A1* | 5/2016 | Denise | G06F 11/3037 |
| | | | | 711/170 |
| 2016/0165321 | A1* | 6/2016 | Denoual | H04N 21/4728 |
| | | | | 725/116 |
| 2016/0191931 | A1* | 6/2016 | Hannuksela | H04N 19/136 |
| | | | | 375/240.12 |
| 2016/0234144 | A1* | 8/2016 | Hannuksela | H04N 19/30 |
| 2016/0261928 | A1* | 9/2016 | Sarda | H04N 21/4402 |
| 2017/0302949 | A1* | 10/2017 | Malamal Vadakital | |
| | | | | H04N 19/503 |
| 2018/0213298 | A1* | 7/2018 | Kitahara | H04N 21/435 |
| 2019/0052937 | A1* | 2/2019 | Malamal Vadakital | |
| | | | | H04N 21/85406 |
| 2019/0238950 | A1* | 8/2019 | Stockhammer | H04N 21/812 |
| 2019/0281100 | A1* | 9/2019 | Lo | H04L 65/612 |
| 2020/0092600 | A1 | 3/2020 | Di et al. | |
| 2020/0245041 | A1 | 7/2020 | Maze et al. | |
| 2020/0411021 | A1* | 12/2020 | Hamada | G11B 27/30 |
| 2021/0105313 | A1* | 4/2021 | Wang | H04L 65/70 |
| 2021/0194946 | A1* | 6/2021 | Hannuksela | H04N 21/85406 |
| 2021/0227231 | A1* | 7/2021 | Hannuksela | H04N 19/46 |
| 2021/0258659 | A1* | 8/2021 | Hannuksela | H04N 21/85406 |
| 2021/0274176 | A1* | 9/2021 | Kang | H04N 19/157 |
| 2021/0326406 | A1* | 10/2021 | Wang | G06N 3/08 |
| 2022/0109861 | A1* | 4/2022 | Hannuksela | H04N 19/167 |
| 2023/0345025 | A1* | 10/2023 | Wang | H04N 21/6547 |
| 2024/0022787 | A1* | 1/2024 | Aksu | G06N 3/063 |

OTHER PUBLICATIONS

Jean Le Feuvre, Raw AV in ISOBMFF, International Organisation for Standardisation, ISO/IEC JTC 1/SC 29/WG 11, Coding of Moving Pictures and Audio, Apr. 2018, San Diego, US, Doc. No. MPEG2016/M42594, XP30070933A.

Information technology—Coding-independent code points—Part 2: Video, Text of ISO/IEC CD 23091-2:202x Video, 2nd Edition, ISO/IEC JTC 1/SC 29/WG 11, Apr. 24, 2020, Doc. No. N19208, XP030289550A.

* cited by examiner

| Byte 2 | | | | | | | | Byte 1 | | | | | | | | Byte 0 | | | | | | | |
|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 9 | 8 | 7 | 6 | 5 | 4 | 3 | 2 | x | x | 1 | 0 | x | x | 1 | 0 | 9 | 8 | 7 | 6 | 5 | 4 | 3 | 2 |

METHOD AND APPARATUS FOR ENCAPSULATING UNCOMPRESSED IMAGES AND UNCOMPRESSED VIDEO DATA INTO A FILE

CROSS REFERENCE TO RELATED APPLICATION

This application is the National Phase application of PCT Application No. PCT/EP2022/050035, filed on Jan. 3, 2022. This application claims the benefit under 35 U.S.C. § 119(a)-(d) of United Kingdom Patent Application No. 2100151.6, filed on Jan. 6, 2021 and entitled "METHOD AND APPARATUS FOR ENCAPSULATING UNCOMPRESSED IMAGES AND UNCOMPRESSED VIDEO DATA INTO A FILE", of United Kingdom Patent Application No. 2109380.2, filed on Jun. 29, 2021 and entitled "METHOD AND APPARATUS FOR ENCAPSULATING UNCOMPRESSED IMAGES AND UNCOMPRESSED VIDEO DATA INTO A FILE", of United Kingdom Patent Application No. 2113868.0, filed on Sep. 28, 2021 and entitled "METHOD AND APPARATUS FOR ENCAPSULATING UNCOMPRESSED IMAGES AND UNCOMPRESSED VIDEO DATA INTO A FILE", and of United Kingdom Patent Application No. 2115960.3, filed on Nov. 5, 2021 and entitled "METHOD AND APPARATUS FOR ENCAPSULATING UNCOMPRESSED IMAGES AND UNCOMPRESSED VIDEO DATA INTO A FILE". The above cited patent applications are incorporated herein by reference in their entirety.

FIELD OF THE INVENTION

The present disclosure concerns a method and a device for encapsulating uncompressed video data or uncompressed images into a file. It concerns more particularly the definition of descriptive metadata for the description of the uncompressed video data or uncompressed images.

BACKGROUND OF INVENTION

Uncompressed video sequence can be organized in a huge variety of formats. A video sequence is typically a sequence of images, also called frames or samples. Each frame is an image typically defined as an array of elementary points called pixels. A frame is composed of one or several components. Each component gives some information on the values of the pixels of the frame. Each component is composed of a set of component values. A component may have a number of component values corresponding to the number of pixels in the frame. In some case, some component may have a number of component values different from the number of pixels in the frame. For example, a YUV frame may have a first component, corresponding to Y, and having one luminance value for each pixel of the frame. The YUV frame may have two components, corresponding to U and V, and having respectively one chrominance U value and one chrominance value V, for each block of four pixels in the frame. In this example, the component Y has a number of component values, corresponding to the number of pixels, four time greater than the number of component values of the components U and V.

Some components may provide auxiliary data not directly directed to the pixel values of the frame. For example, some components may provide alpha values relative to a transparency associated with the pixels. Other components may provide depth information relative to the distance of the object from the camera for each pixel position. These auxiliary components may have a number of component values corresponding to the number of pixels in the frame, but this may not be the case.

The component values may be encoded according to various binary format. While the color components have typically component values encoded as unsigned integers, the auxiliary components may have component values encoded in any type of binary encoding like, for example, signed integers, floating point values, complex values, and so on. Even considering color components encoded as unsigned integers, the number of bits used for encoding each value may differ, corresponding to different bitdepths for the different components.

The different formats of uncompressed video sequences may also differ in the way they organize the different component values in sequence for a given frame. A first example consists in interleaving the different component values corresponding to a same pixel. For example, if a RGB frame is composed of three color components, R, G, and B, the component values may be organized per pixel as $(R_1, G_1, B_1)$, $(R_2, G_2, B_2)$, . . . , $(R_n, G_n, B_n)$. This type of organization is called "packed". The same RGB frame may be organized by component. In this example, all the R values are followed by all the G values, which are followed by all the B values, as $R_1, R_2, \ldots, R_n, G_1, G_2, \ldots, G_n, B_1, B_2, \ldots, B_n$. This type of organization is called "planar". Hybrid organizations may be contemplated where some components use a packed organization, while others use a planar organization for a same frame. These two types of organization are called the pixel representation of the component.

Known file formats used to encapsulate uncompressed video sequences are based on a priori knowledge of a set of uncompressed video sequence formats. Each format defines the number and types of components, whether they use a packed or planar organization, the binary encoding of the component values and their number, and so on. The uncompressed video sequence format is identified with an identifier typically introduced in a header of the file. A parser, in order to be able to parse the file, is supposed to know the uncompressed video sequence format corresponding to this identifier and to parse the file accordingly.

Besides the obvious, reading, parsing and rendering of the video sequence, a parser may be expected to be able of basic manipulations on an uncompressed video sequence file. These basic manipulations comprise temporal sub-bitstream extraction, namely extraction of a sub-sequence of frames between two temporal values. These basic manipulations also comprises the extraction of some components of the uncompressed video sequence or the extraction of a spatial region of interest in the uncompressed video sequence. Advantageously, the encapsulation of uncompressed video sequence should ease these manipulations by a parser.

SUMMARY OF THE INVENTION

The present invention has been devised to address one or more of the foregoing concerns.

According to a first aspect of the invention, there is provided a method of encapsulating one or more uncompressed images in a media file, each uncompressed image comprising one or more components, wherein the method comprises:

generating generic description information describing the components of the images, the generic description information indicating that the images are uncompressed; and encapsulating the generic description information and the one or more images in the media file, the uncompressed images being encapsulated as one or more image items, the generic description information being encapsulated in a metadata part of the media file describing the image items.

In an embodiment, the generic description information comprises for each image item a data structure describing the image item, the data structure comprising an "item type" field indicating that the image item is uncompressed.

In an embodiment, the generic description information comprises an "item property" data structure comprising the description of the components of the uncompressed image.

In an embodiment, different components of an uncompressed image are encapsulated into different image items in the media file.

In an embodiment, the image items comprising the different components of an uncompressed image are grouped in a group of image items.

In an embodiment, the item property data structure comprising a description of the components of the uncompressed image is associated with the group of image items.

In an embodiment, the uncompressed image is encapsulated in an uncompressed image item referencing the different image items encapsulating the different components of the uncompressed image.

In an embodiment, at least part of the generic description information is comprised in a data part of the uncompressed image item.

In an embodiment, several components of an uncompressed image are encapsulated into a first image item, and at least another component of the uncompressed image is encapsulated into a second image item.

In an embodiment, the generic description information comprises an indication that a component of an uncompressed image corresponds to an output of a Bayer filter.

According to another aspect of the invention, there is provided a method of reading a media file comprising one or more uncompressed images, each uncompressed image comprising one or more components, wherein the method comprises:
  obtaining from the media file a generic description information describing the components of the images, the generic description information indicating that the images are uncompressed; and
  reading from the media file at least an uncompressed image based on the generic description information, the uncompressed images being encapsulated as one or more image items, the generic description information being encapsulated in a metadata part of the media file describing the image items.

According to another aspect of the invention, there is provided a computer program product for a programmable apparatus, the computer program product comprising a sequence of instructions for implementing a method according to the invention, when loaded into and executed by the programmable apparatus.

According to another aspect of the invention, there is provided a computer-readable storage medium storing instructions of a computer program for implementing a method according to the invention.

According to another aspect of the invention, there is provided a computer program which upon execution causes the method of the invention to be performed.

According to another aspect of the invention, there is provided a device for encapsulating one or more uncompressed images in a media file, each uncompressed image comprising one or more components, wherein the device comprises a processor configured for:
  generating generic description information describing the components of the images, the generic description information indicating that the images are uncompressed;
  encapsulating the generic description information and the one or more images in the media file, the uncompressed images being encapsulated as one or more image items, the generic description information being encapsulated in a metadata part of the media file describing the image items.

According to another aspect of the invention, there is provided a device for reading a media file comprising one or more uncompressed images, each uncompressed image comprising one or more components, wherein the device comprises a processor configured for:
  obtaining from the media file a generic description information describing the components of the images, the generic description information indicating that the images are uncompressed; and
  reading from the media file at least an uncompressed image based on the generic description information, the uncompressed images being encapsulated as one or more image items, the generic description information being encapsulated in a metadata part of the media file describing the image items.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 7 illustrates an example of format for uncompressed video sequence;

DETAILED DESCRIPTION OF THE INVENTION

Figure 1A:
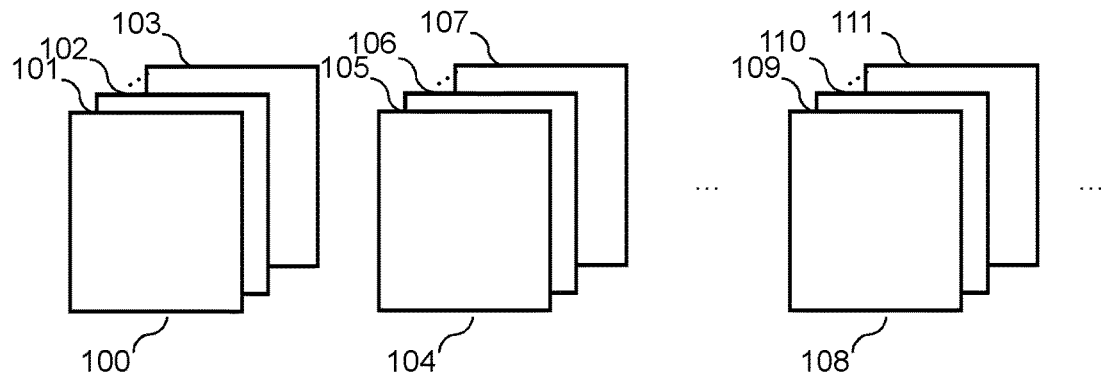
FIGS. 1a, 1b, and 1c illustrates several examples of bitstreams representing an uncompressed, also called raw, video sequence.
Figure 1B:
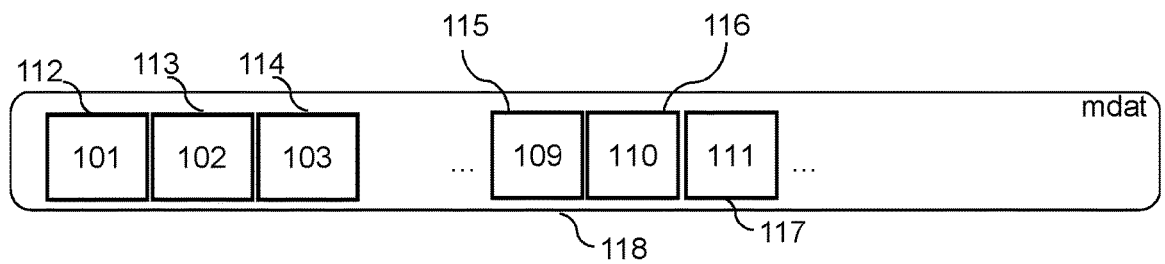
Figure 1C:
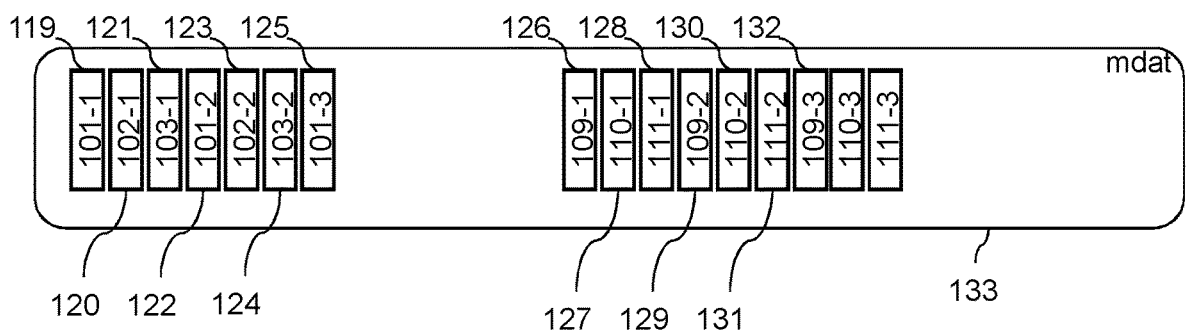

FIGS. 1a, 1b, and 1c illustrates several examples of bitstreams representing an uncompressed, also called raw, video sequence. An uncompressed video sequence is composed of one or more samples representing a particular instant of time. Each of this sample contains one or more components. Typically, each component represent information of a colour of pixel data. It can be for example, grayscale information for monochrome samples or RGB or YCbCr or YUV components for coloured image; it can also contains other information not necessary representing pixel information. For instance, one sample may contain alpha, transparency or/and depth information in separate components of the samples. More generally, the information provided in a component is a set of values that pertains to a particular timing in the uncompressed video information. Another example is timed metadata information describing the pixels samples.

The video sequence of FIG. 1a is composed of a series of samples 100, 104 and 108 each comprising a number of components. The sample 100 contains a series of components 101, 102 and 103; the sample 104 contains the components 105, 106 and 107; and finally the sample 108 contains the components 109, 110 and 111.

Different bitstream representations of the values contained in each component of each sample are employed in the state of the art. For example, the YUV I420 format codes first all the component values of the Y channel followed by the values of the Cb component and then by the values of the Cr component. This kind of representation is often referred to as a planar representation: the values for a component are represented as a plane that is a set of consecutive bits in memory. For example, the FIG. 1b illustrates a bitstream 118 with a planar representation of the components of the video sequence of FIG. 1a. The first byte range 112 of the bitstream 118 contains the values of the first component 101 of the first sample of the video sequence. The next range of bytes 113 contains the values of the second component 102 of the first frame followed by the byte range 114, which completes the sample with the values of the component 103. The same bitstream pattern is used for the following sample and the bitstream ends with the byte ranges 115, 116 and 117 wherein each byte range contains respectively the values of the components 109, 110, 111 of the last sample of the video sequence.

Another representation of the values of the components in the bitstream is the packed representation. Instead of storing the component inside separate ranges of the bitstream, the values of the components are interleaved in memory. Typically, the bitstream contains first the first value of the first component followed by the first value of the second component and so on for all the components and for all the values of the components. As a result, the values corresponding to a pixel (i.e. the components representing one spatial sample) are represented inside a contiguous range in the bitstream. The number of values in each component may differ (typically sampling rate of chroma components could be lower than for the luma component). In such a case, the number of component values between two different values one of the same component is not necessarily a constant. FIG. 1c is an example of bitstream 133 using a packed representation for the components of the video sequence of FIG. 1a. This bitstream 133 contains series of bytes 119 to 132, which successively contains a value of each component of the samples of the video sequences. For instance for the first sample of the video sequence, the series of bytes 119 contains the first value of the component 101, and is followed by the byte series 120 that contains the first value of the component 102; and finally the byte series 121 contains the first value of the component 103. This pattern is repeatedly applied to each value of each component of the video sequence. Thus, the byte series 123, 124 and 125 contain respectively the second value of the components 101, 102 and 103. The byte series 126 to 132 contain the equivalent information for the last sample of the video sequence.

In both the planar and packed representations, a component value may be stored on a non-integer number of bytes. For example a component value may be stored using 12 bits.

A sample is defined in this document as corresponding to all the data associated with a single time instant. Usually, two samples within a track do not share the same decoding time; and two samples don't share the same composition time. In non-hint tracks, a sample is, for example, an individual frame of video, a series of video frames in decoding order, or a compressed section of audio in decoding order; in hint tracks, a sample defines the formation of one or more streaming packets.

For convenience in the writing of the document, the words image or picture or frame refer to the sample of the video sequence even if the sample contains non-pixels information. Similarly, a pixel is considered as the set of values of all the components corresponding to a specific spatial location in one of the picture of the video sequence. It comprises component values corresponding to colour information and component values corresponding to metadata (e.g. alpha channel, depth map etc.).

When encapsulating one or more video sequence in a media file, typically complying with the ISOBMFF standard, the video sequence are typically stored as tracks. This type of media file is composed of hierarchical embedded data structure, also called boxes. Video sequence media data are typically stored in a media data structure like the "mdat" boxes 118 and 133 in FIG. 1b and FIG. 1c. The media file typically further comprises descriptive metadata describing the different tracks.

Sample description is a descriptive metadata structure that defines and describes the format of some number of samples in a track.

A sample entry type is a four-character code that is either a format value of a SampleEntry metadata structure directly contained in SampleDescriptionBox metadata structure or a data_format value of OriginalFormatBox.

Figure 2:
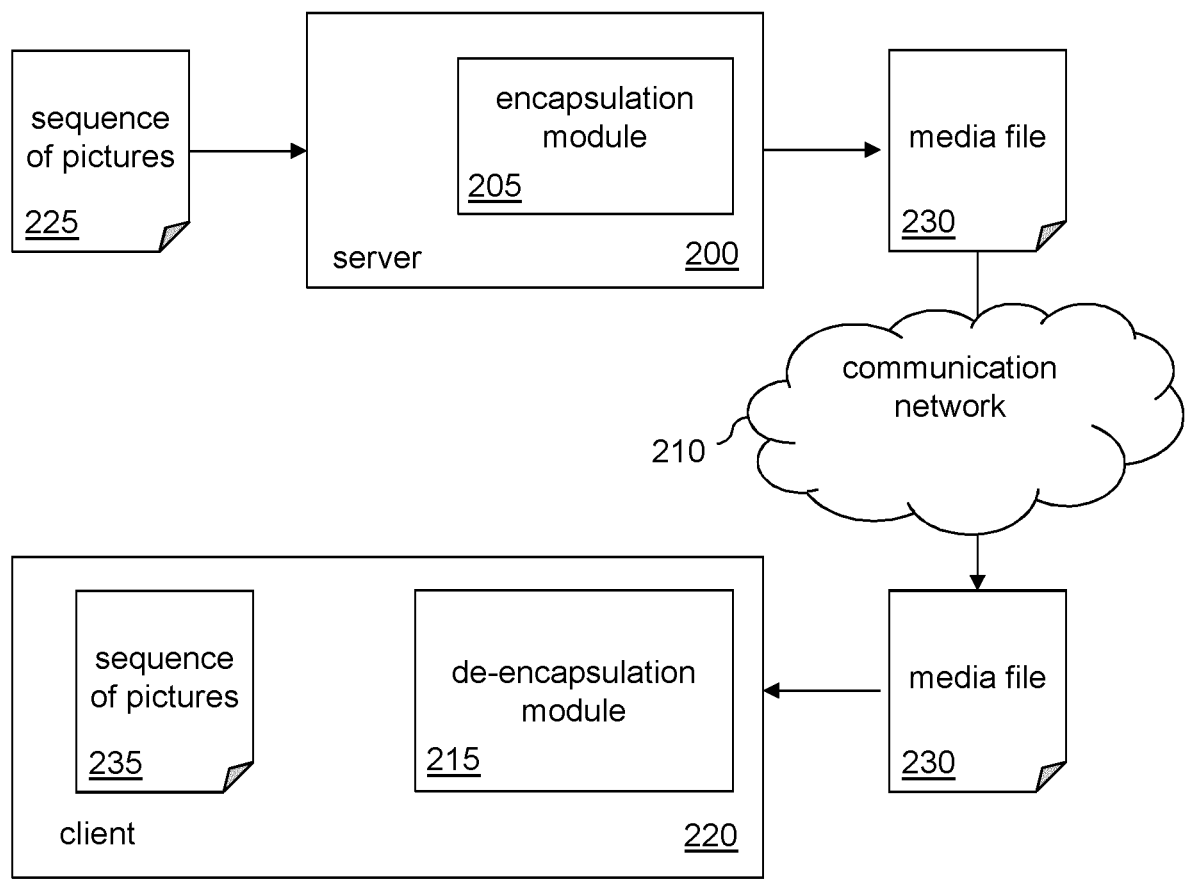
FIG. 2 illustrates an example of streaming media data system from a server to a client.

FIG. 2 illustrates an example of streaming media data system from a server to a client. As illustrated, a server 200 comprises an encapsulation module 205, connected via a network interface (not represented), to a communication network 210 to which is also connected, via a network interface (not represented), to a de-encapsulation module 215 of a client 220.

The server 200 processes data, e.g. video and/or audio data, for streaming or for storage. To that end, the server 200 obtains or receives data comprising, for example, the recording of a scene by one or more cameras, referred to as a source video. The source video is received by the server as an original sequence of pictures 225. The server encodes the sequence of pictures into media data (i.e. bit-stream) using a media encoder (e.g. video encoder), not represented, and encapsulates the media data in one or more media files or media segments 230 using the encapsulation module 205. The encapsulation module 205 comprises at least one of a writer or a packager to encapsulate the media data. The media encoder may be implemented within encapsulation module 205 to encode received data or may be separated from encapsulation module 205.

The client 220 is used for processing data received from the communication network 210, for example for processing the media file 230. After the received data have been de-encapsulated in the de-encapsulation module 215, also known as a parser, the de-encapsulated data or parsed data, corresponding to a media data bit-stream, are decoded, forming, for example, audio and/or video data that may be stored, displayed or output. The media decoder may be implemented within de-encapsulation module 215 or it may be separate from de-encapsulation module 215. The media decoder may be configured to decode one or more video bit-streams in parallel.

It is noted that media file 230 may be communicated to the de-encapsulation module 215 in different ways. In particular, the encapsulation module 205 may generate the media file 230 with a media description (e.g. DASH MPD) and communicates (or streams) it directly to the de-encapsulation module 215 upon receiving a request from the client 220. The media file 230 may also be downloaded by and stored on the client 220.

For the sake of illustration, the media file 230 may encapsulate media data (e.g. encoded audio or video) into boxes according to ISO Base Media File Format (ISOBMFF, ISO/IEC 14496-12 and ISO/IEC 14496-15 standards). In such a case, the media file 230 may correspond to one or more media files, indicated by a FileTypeBox 'ftyp', or one or more segment files, indicated by a SegmentTypeBox 'styp'. According to ISOBMFF, the media file 230 may include two kinds of boxes, a "media data box", identified as 'mdat' or 'imda', containing the media data and "metadata boxes" (e.g. 'moov' or 'moof') containing metadata defining the location and timing of the media data. In a particular embodiment, the sequence of pictures 225 is encoded, or compressed, according to an uncompressed video format such as the YUV I420 format. The encoding consists then in representing the sensor information in one or more set of components values with a predefined order. In addition, the encoder may encode audio source in the media bitstream.

Figure 3:
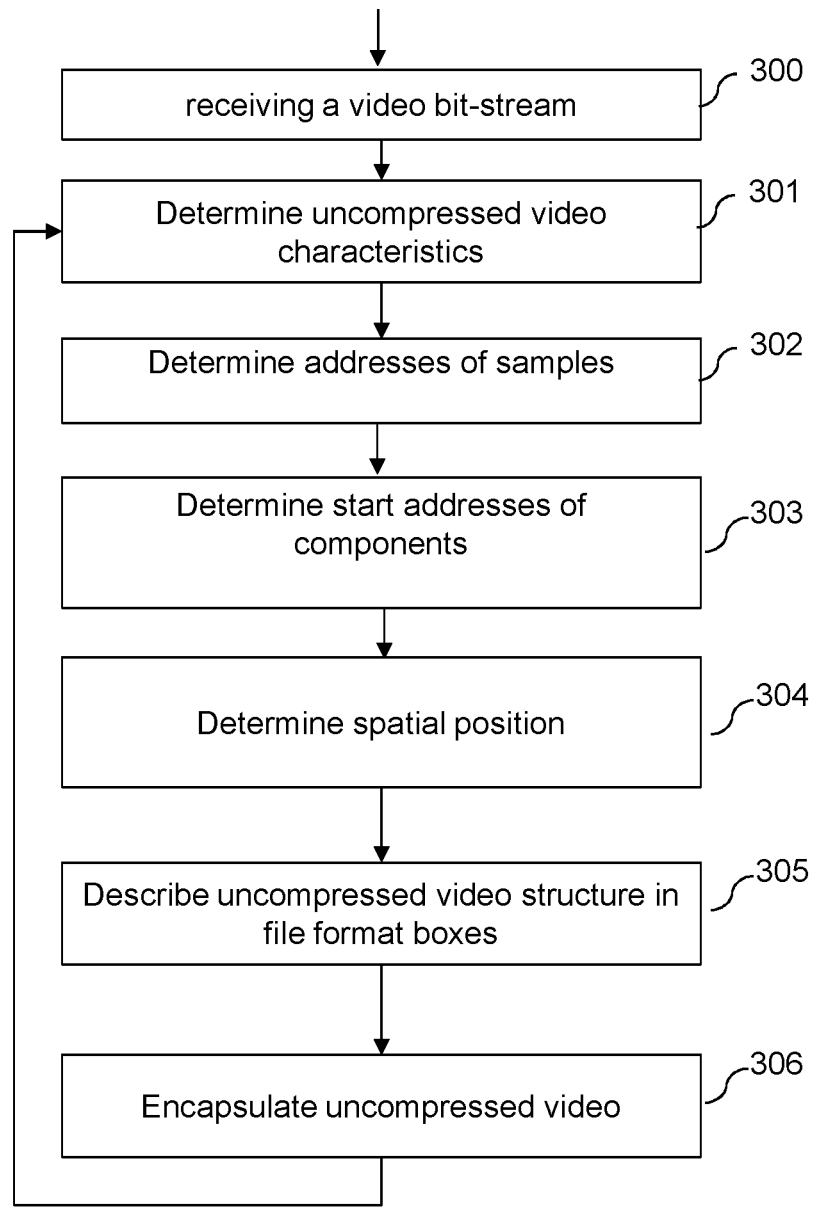
FIG. 3 illustrates an example of an encapsulation process according to embodiments of the invention.

FIG. 3 illustrates an example of an encapsulation process according to embodiments of the invention. In a first step 300, the media file writer receives the video bitstream, for instance an uncompressed video sequence as represented with reference to FIG. 1, to process. The encapsulation process consists in applying a processing loop for each sample of the input video sequence. In particular, it starts by determining the uncompressed video characteristics, or attributes, in a step 301. The characteristics of the uncompressed bitstream comprise information specifying the content of the video sequence such as the number of samples provided in the bitstream and the uncompressed format of the input video sequence. This information is provided within the bitstream as a predetermined byte sequence at the beginning of the input bitstream or can be provided as a configuration file of the file writer. In particular, the characteristics of the input video compressed comprise the number of components present within each picture and for each component the number of coded values. In addition, it is provided the coding format of each component, typically planar or packed, in addition to the coding pattern of component values used for each sample. Finally, the number of pictures or samples provided in the input bitstream can be provided or deduced from the length in bits or bytes of the input video sequences.

From the characteristics information of the input bitstream, the file writer deduces the byte or bit addresses of each sample in the bitstream in a step 302. This information is advantageously stored in memory for later use. Similarly, in a step 303, the file writer determines the start addresses of each component relatively to the start address of the sample and stores it in memory. Last, the determination step 304 associates spatial information with component values. Typically for coloured components, it is determined the pixel coordinates of each component value. Again, this information is stored in memory.

Then, the writer generates in a step 305, information on the structure of the uncompressed video stream that is signalled in different boxes of the ISOBMFF output file. This information is a generic representation of the main structures, typically, the samples, the components and the values of the components, of an uncompressed or raw video sequence. Several alternative embodiments to signal this information at different locations of the bitstream are proposed. Some of these embodiments are described with reference to FIG. 5.

Finally, the process encapsulates the bitstream of the uncompressed video sequence in one or more tracks and the bytes forming the bitstream are stored in an 'mdat' box. Typically, when more than one tracks are used, the encapsulation process may, for example, encapsulate image components in one track and the remaining components in a different. According to another example, each component of the video sequence may be described in its own track.

Figure 4:
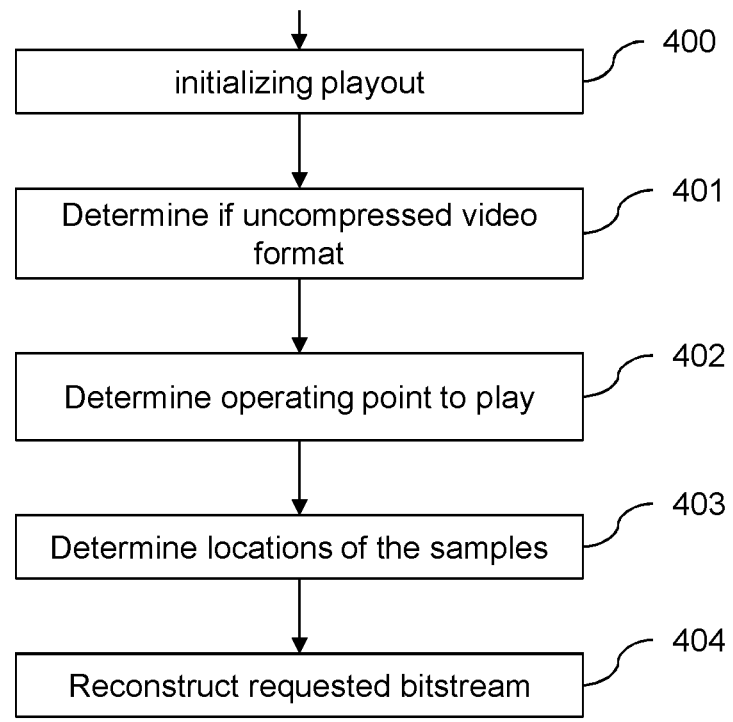
FIG. 4 illustrates an example of the main steps of a parsing process according to an embodiment of the invention.

FIG. 4 illustrates an example of the main steps of a parsing process according to an embodiment of the invention. According to this embodiment, the media file contains information specifying a generic representation of an uncompressed video sequence coding structure.

As illustrated, a first step 400 is directed to initializing a media player to start reading a media file encapsulated according to some embodiments of the invention. Next, the media player determines, in a step 401, if the media file content relates to uncompressed video format, typically by the presence of one or more boxes comprising information that is part of the generic representation of uncompressed video sequence as generated in a step 305 of the file writer process.

During step 402, the player determines the operating point requested for the playout. Typically, the operating point is information specifying the expected samples to be played. In addition, the operating point may select a subset of the components. In yet another alternative, it may also specify a predetermined spatial area of the media sample i.e. a zone in a picture for colour components. For non-colour component, the component values may also be associated to a spatial portion of the video.

Based on the information determined in step 401 and 402, the media player can identify the set of component values that should be extracted from the media file data, typically within the 'mdat' container. In a step 403, the file parser determines from the descriptive metadata boxes that contain information specifying the generic representation of the uncompressed video sequence coding structure, the location, meaning the byte or bit address inside the 'mdat' container, of the requested component values.

The final stage 404 of the media player process consists in forming the reconstructed bitstream that corresponds to the selected operating point. In particular, the reconstructed bitstream may include a subset of the values of the original uncompressed video sequence.

Figure 5:
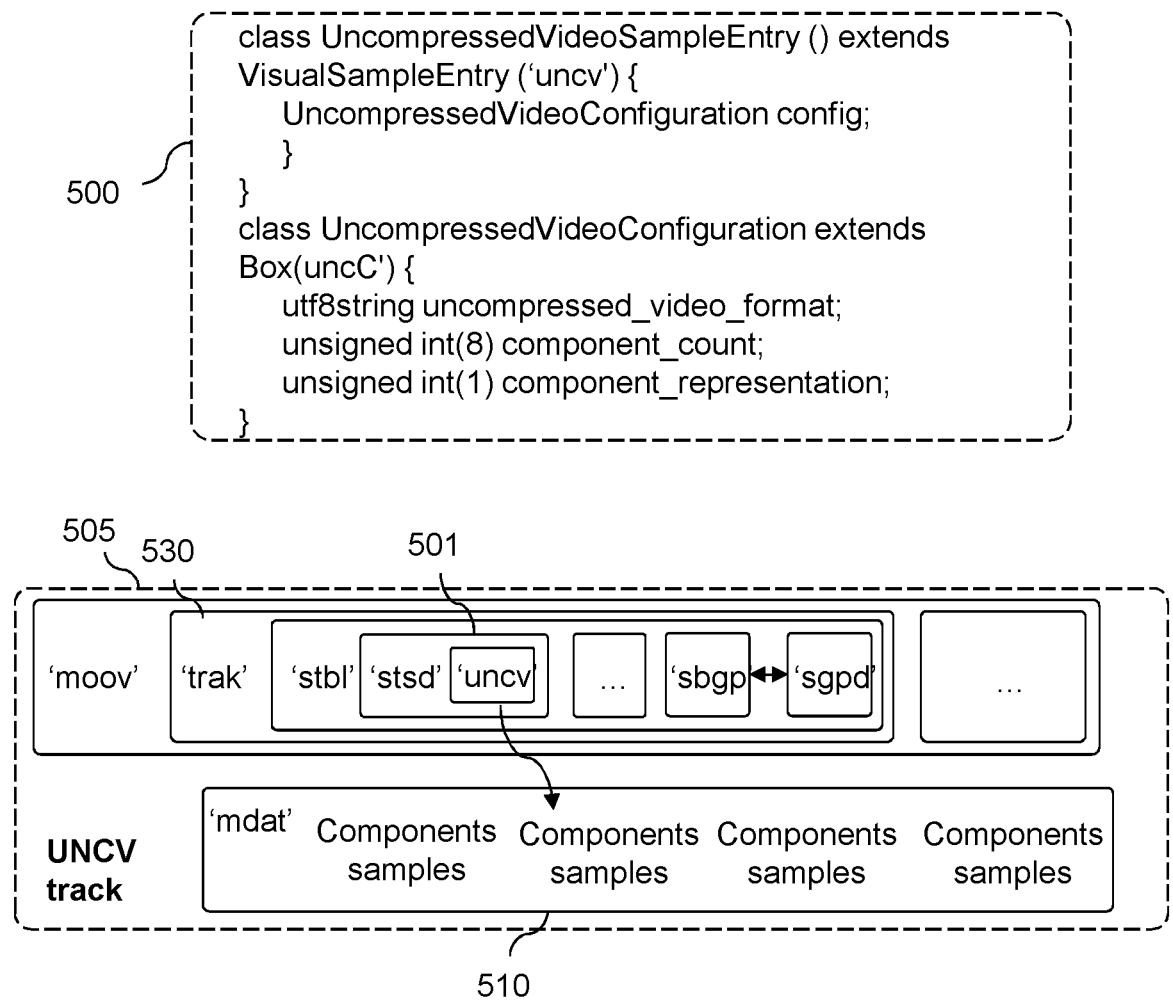
FIG. 5 illustrates an example of media file 505 according to an embodiment of the invention.

FIG. 5 illustrates an example of media file 505 according to an embodiment of the invention. In this example, the media file complies with the ISOBMFF standard. The media file 505 contains an uncompressed video sequence in an 'mdat' data structure 510 along with associated descriptive metadata in a 'trak' data structure 530. The 'trak' data structure 530 comprises the description of several components of the uncompressed video sequence.

The sample description information 501 includes a generic description 500 of the samples and of the component data of the uncompressed video sequence described by the 'trak' box 530. The generic description information 500 comprises several attributes according to embodiments of the invention. For example, it may contain information that allows a parser to extract a subpart of the bitstream of the uncompressed video data present in the data part of the file, i.e. in the 'mdat' data structure.

According to a first embodiment, the generic description information specifying the main properties of uncompressed video data is represented by a dedicated box of the ISOBMFF file. The generic description information describes the video data, it indicates that the video sequence is uncompressed. For example, this generic description information may be provided in a Sample Entry box according to the following syntax:

```
class UncompressedVideoSampleEntry extends VisualSampleEntry('uncv')
{
  UncompressedVideoConfiguration config;
}
```

This new UncompressedVideoSampleEntry extends the VisualSampleEntry with the 'uncv' coding name. The presence of this box in the track description indicates to the parser at step 301 in FIG. 3 that the media data of the track corresponds to one or more uncompressed video samples that are described by the included generic representation information.

In this example, the UncompressedVideoSampleEntry comprises a configuration box named UncompressedVideoConfiguration. This box comprises additional information that specifies the coding structure of the uncompressed video sequence. It indicates a number of components used for encoding pixel information for at least one sample. For example, the UncompressedVideoConfiguration may have the following syntax:

```
class UncompressedVideoConfiguration extends Box(uncC') {
  utf8string uncompressed_video_format;
  unsigned int(8) component_count;
  unsigned int(1) component_representation;
}
```

With the following semantics:

The uncompressed_video_format field specifies the type of the coding format used for the uncompressed video sequence. The purpose of this field is purely informative and must not be used by the parser to determine the properties of the uncompressed video data format. In other words, the parser is not supposed to use the content of this field to determine how to parse the media data. Typically, the media file parser forwards this element to the application using the video data to select the appropriate handler to process the bitstream constructed by the parser. For instance, this element may comprise the 'YUV I420' character string indicating that the sequence is a YUV video sequence using the I420 chroma format. Another example is 'PUVF v2.0' that indicates a proprietary uncompressed video format in a 2.0 version.

The field component_count indicates the number of components in each sample of the video data.

The field component_representation indicates the pixel representation of the components. In this embodiment it is a flag indicating whether the representation is packed or planar. For example, a value '1' indicates that a planar representation is used, and a value '0' indicates that a packed representation is used.

In this embodiment, it is assumed that all the components have a same number of values and that these values have the same bit length. The number of component values is equal to the number of pixels of the sample, which is signaled in the VisualSampleEntry through the indication of the width and height of the sample.

In a variant of this embodiment, the number of values per component may be indicated in an additional syntax element. This variant allows describing an uncompressed video sequence with a sampling of the components coarser than the pixel granularity.

The component_value_length variable is the length in bits of each component value and is equal to the size of the component (component size) divided by the number of component values (component_value_count).

As a result, the byte address of the component relatively to the address of the first byte of each sample is determined as follows. The length in bytes of the current sample is determined using the metadata inside the ISOBMFF. For example, it is determined with the help of a SampleSizeBox present in the descriptive metadata of the track. It is assumed in this embodiment that each component has the same length. The length in bits of each component is thus the size of the sample in bits divided by the number of components:

component size=sample_size*8/component_count

The start address of each component depends on the representation format. If a planar representation is used (the component_representation field is equal to 1), the first value of the i-th component, using a 0-based index, is equal to the bit location of the j-th sample (for example defined by a sample_start_offset[j] variable) plus the product of i and component size:

component_start_address[i]=sample_start_offset[j]+ i*component size

The parser may determine for example the bit (or byte) location of the j-th sample of the bitstream in a fragmented file from the TrackRunBoxes, or from the information in the SampleSizeBox, SampleToChunkBox and ChunkOffsetBox in a non-fragmented file.

The location of the n-th value of the i-th component in planar mode is made relatively to the address of the first value since the values of the component are contiguous in memory. The component_value_address[i][n] variable represents this location, wherein n is in the range from 0 to component_value_count−1 and i is in the range from 0 to component_count−1. It is equal to the address of the first value plus n times the length of the component value.

component_value_address[i][n]=component_start_address[i]+n*component_value_length If a packed representation is used (the component_representation field is equal to 0), the n-th value of the i-th component is represented by component_value_address[i][n] with n in the range from 0 to component_value_count−1 and i in the range from 0 to component_count−1. It is equal to the bit location of the j-th sample (sample_start_offset[j]) plus the product of i and the length in bits of the component value plus n multiplied by the length in bits of the component value multiplied by the number of component in the sample.

component_value_address[i][n]=sample_start_offset[j]+i*component_value_length+n*component_value_length*component_count The generic information provided in the UncompressedVideoConfiguration allows thus a parser to determine the location of each value of each component of each sample within the uncompressed video sequence. It can then perform sub bitstream extraction of values of one or more components with a specific time interval from the media file without a priori knowledge of the coding format in use for the uncompressed video sequence.

In one alternative, the SampleGroupDescription box specifies the generic information representing the uncompressed video sequence instead of a SampleEntry box. As a result, instead of specifying constant generic information for all the samples of the media file, the information can be dynamic and can vary from one group of samples to another. It enables to support uncompressed format with different component configurations for different samples of the video sequence.

In another alternative, the uncompressed_video_format field is specified as an unsigned integer. Each coding format is associated to a predefined value. Possibly some values are reserved for proprietary formats. Possibly, a specific value may be reserved for signaling the presence of a supplementary field allowing to described proprietary of new coding formats. Possibly, the uncompressed_video_format field may be an URN or URL. Note that these alternatives may also apply to other embodiments of the invention.

This first embodiment allows a very compact representation of the generic information while assuming some constraints on the format of the uncompressed video data. It is assumed that all the components have the same format, same size and same bit length per component value and the same number of values for each component.

In a second embodiment the generic information is completed to allow describing a different format for each component. For instance, the I420 format uses a different number of component values for the luminance component Y than for the chrominance components Cr and Cb. In this embodiment, the UncompressedVideoConfiguration box is enriched to define a different generic representation for each component. The syntax may be as follows:

```
class UncompressedVideoConfiguration extends Box(uncC') {
    utf8string uncompressed_video_format;
    unsigned int(8) component_count;
```

```
    unsigned int(1) component_representation;
    for (i = 1 ; i <= component_count ; i++) {
        UncompressedVideoSampleComponent( )
    }
}
```

This new version of the box provides a signalling loop that indicates a component description information for at least one component, possibly for all components, which comprises at least a number of component values and a component value length for the component. The UncompressedVideoSampleComponent structure is a new ISOBMFF box that represents this information. The order of the components in this signalling is the same as the component order in the bitstream.

In one example, the UncompressedVideoSampleComponent may have the following syntax:

```
class UncompressedVideoSampleComponent( ) {
    unsigned int(32) component_value_count;
    unsigned int(8) component_value_length;
}
```

With the following semantic:
The component_value_count field indicates for the given component the number of component values in a sample.
The component_value_length indicates the number of bits of a component value.

These two fields allows describing an uncompressed video format where the different components may have different numbers of component values and different binary encodings of the component values. In a variant, the UncompressedVideoSampleComponent structure uses two fields to specify the component values bit length: the first field is the floor of the length value in bits divided by 8, meaning that this field gives a number of bytes. The second field is optional and is the remainder of the division of length value in bits by 8. For example, the first field is equal to 4 and the second equal to 0 for a length of 32 bits while the first field is equal to 4 and the second is equal to 3 for a length of 35 bits. This two-field representation can be more compact for high number of bits per component.

Based on these two additional fields in this second embodiment, the parser is in position to determine the address of each component in a planar representation: the total size in bits of the values of a component is equal to the number of its values, as provided by component_value_count, multiplied by the length of the component values, as provided by component_value_length in bits.

component_size=component_value_count*component_value_length

This component_size value may be different for each component of the sample: the component_size[i] variable thus represents the value of component_size for the i-th component that is computed from the values of the i-th UncompressedVideoSampleComponent structure within the UncompressedVideoConfiguration box. Similarly, the variables component_value_count[i] and component_value_length[i] correspond to the values of component_value_count and component_value_length of the i-th UncompressedVideoSampleComponent structure within the UncompressedVideoConfiguration box.

This embodiment concerns in particular video sequences for which all the components use planar or packed representation. In other words, there is no component that use a planar representation while other components use a packed representation. The component location can be determined as follows by the media file parser.

The start address of each component depends on the representation format. If a planar representation is used, the component_size_cumul[i] variable is computed as the sum of the sizes of the components that are represented prior to the i-th component:

```
component_size_cumul[0] = 0
for (i=1; i < component_count; i++) {
   component_size_cumul[i] = component_size_cumul[i-1]+
   component_size[i-1]
}
```

The first value of the i-th component in planar representation is equal to the bit location of the j-th sample (sample_start_offset[j]) plus the sum of the sizes of the component that is prior to the i-th component (component_size_cumul[i]):

component_start_address[$i$]=sample_start_offset[$j$]+ component_size_cumul[$i$]

The location of the n-th value of the i-th component is the component_value_address[i][n] variable wherein n is in the range from 0 to component_value_count−1 and i is in the range from 0 to component_count−1. In planar mode, this location is relative to the address of the first value since the values of a component are contiguous in memory. It is equal to the address of the first value plus n times the length of the component value.

component_value_address[$i$][$n$]=component_start_address[$i$]+$n$*component_value_length[$i$]

If a packed representation is used, the component_stride variable is the length in bits taken by the set of packed component values for one pixel. It is equal to the sum of the lengths of component values. The component_value_length_cumul[i] is the sum of the lengths of the values of the components that have an index lower than the i-th component.

```
component_stride = component_value_length[0]
component_value_length_cumul[0] = 0
for (i=1; i < component_count; i++) {
   component_stride += component_value_length[i]
   component_value_length_cumul[i] =
   component_value_length_cumul [i−1]+
   component_value_length[i−1]
}
```

Therefore, the address of n-th value of the i-th component is the component_value_address[i][n] variable, wherein n is in the range from 0 to component_value_count−1 and i is in the range from 0 to component_count−1. It is equal to the bit location of the j-th sample (sample_start_offset[j]) plus the sum of the lengths of the values of the components that have an index lower than the i-th component (component_value_length_comul[i]) plus n multiplied by the length in bits taken by the set of packed component values for one pixel.

component_value_address[$i$][$n$]=sample_start_offset[$j$]+component_value_length_cumul[$i$]+ $n$*component stride In a third embodiment, the information describing a generic representation is modified to allow specifying different configurations for each component with possibly different pixel representations. This embodiment addresses uncompressed video sequences where the components in planar or packed representations may be mixed without any constraint.

According to a first variant of the third embodiment, a syntax element is provided in the UncompressedVideoConfiguration box indicating the pixel representation of each component. The syntax of the UncompressedVideoConfiguration may be:

```
class UncompressedVideoConfiguration extends Box('uncC') {
   utf8string uncompressed_video_format;
   unsigned int(8) component_count;
   for (i = 1 ; i <= component_count ; i++) {
      UncompressedVideoSampleComponent( )
      unsigned int(1) component_packing_type;
      bit(7) reserved;
   }
}
```

Where the syntax element component_packing_type is a flag indicating whether the pixel representation of the component is planar or packed. For example, the value 0 indicates a planar pixel representation, and the value 1 indicates a packed pixel representation. As a packed pixel representation means that the component is interleaved with at least another consecutive component, when a component is indicated as packed, the previous one or the next one must be also indicated as packed. Hereinafter, the set of consecutive components indicated as packed is called a packing set.

The UncompressedVideoSampleComponent contains the following syntax elements with the same semantics as defined in previous embodiments.

```
class UncompressedVideoSampleComponent( ) {
   unsigned int(32) component_value_count;
   unsigned int(8) component_value_length;
}
```

All the consecutive components with a component_packing_type flag indicating a packed pixel representation are interleaved with the same order as signaled in UncompressedVideoConfiguration box. In addition, the same number of values is expected for two consecutive components with a component_packing_type flag indicating a packed pixel representation.

The variable component_start_address[i] has the same meaning as in previous embodiments and is computed for each component of the sample. This variable is further modified below for the components with a packed representation.

component_start_address[i]=sample_start_offset[j]+ component_size_cumul[i].

The location of n-th value of the i-th component, is represented by component_value_address[i][n] variable, wherein n is in the range from 0 to component_value_count−1 and i is in the range from 0 to component_count−1. If the component_packing_type is equal to 0 (planar mode), the location is made relatively to the address of the first value since the values of the component are contiguous in memory. It is equal to the address of the first value plus n times the length of the component value.

component_value_address[$i$][$n$]=component_start_address[$i$]+$n$*component value length[$i$]

If the component_packing_type indicates a packed pixel representation for the i-th component, the component_stride variable is the length in bits taken by the set of consecutive packed component values for one pixel. It is equal to the sum of the lengths of component values. The component_value_length_cumul[i] is the sum of the lengths of the values of the components that have an index lower than the i-th component and are in the same packing set.

Instead of detecting that a new packing set starts when a component has component_packing_type indicating a planar pixel representation, it is based on the value of the component_new_packing_set. The algorithm above becomes:

```
component_packing_set_idx[0] = 0
for (i=1; i < component_count; i++) {
    component_packing_set_idx[i] = component_packing_set_idx[i-1]
    if (component_new_packing_set[i] == 1){
            component_packing_set_idx[i] += 1
    }       if (component_packing_set_idx[i] == component_packing_set_idx[i-1]) {
            component_start_address[i] = component_start_address[i-1]
            component_value_length_cumul[i] = component_value_length_cumul[i-1] + component_value_length[i-1]
            component_stride[component_packing_set_idx[i]] += component_value_length[i]
    }
    else {
            component_value_length_cumul[i] = 0
}}
```

```
component_packing_set_idx[0] = 0
for (i=1; i < component_count; i++) {
   component_packing_set_idx[i] = component_packing_set_idx[i-1]
   if (component_packing_type[i] == 0){
      component_packing_set_idx[i] += 1
   }
   if (component_packing_set_idx[i] == component_packing_set_idx[i-1]) {
      component_start_address[i] = component_start_address[i-1]
      component_value_length_cumul[i] = component_value_length_cumul[i-1] + component_value_length[i-1]
      component_stride[component_packing_set_idx[i]] += component_value_length[i]
   }
   else {
      component_value_length_cumul[i] = 0
}}
```

Therefore, the following formula computes the address of n-th value of the i-th component (represented by component_value_address[i][n] with n in the range from 0 to component_value_count and i in the range from 0 to component_count−1):

component_value_address[$i$][$n$]=component_start_address[$i$]+component_value_length_cumul[$i$]+$n$*component stride[component_packing_set_idx[$i$]]

In an alternative, the UncompressedVideoConfiguration includes a component_new_packing_set flag that is equal to one when the i-th component starts a new packing set. This allows defining four components that are packed two by two.

```
class UncompressedVideoConfiguration extends Box(uncC') {
   utf8string uncompressed_video_format;
   unsigned int(8) component_count;
   for (i = 1 ; i <= component_count ; i++){
      UncompressedVideoSampleComponent( )
      unsigned int(1) component_packing_type;
      unsigned int(1) component_new_packing_set;
      bit(6) reserved;
   }
}
```

In another alternative, the component_packing_type and component_new_packing_set fields are signalled in the UncompressedVideoSampleComponent structures signals instead of in UncompressedVideoConfiguration.

In another alternative, a code point information provided in the UncompressedVideoConfiguration infers the component_packing_type and component_new_packing_set. This code point information of components representation is an unsigned integer for which each value represents a predetermined component configuration.

For instance, the code point equal to 0 indicates that all components have a component_packing_type inferred to be planar. A code point equal to 1 indicates that all components have a component_packing_type inferred to be packed. A code point equal to 3 indicates that the two first components have a component_packing_type inferred to be packed and that the other components have a component_packing_type inferred to be planar. A code point equal to 4 indicates that the three first components have component_packing_type inferred to be planar and that the other components have a component_packing_type inferred to be packed.

In a second variant of the third embodiment, it is assumed that the byte or bit offset between any two values of a given component is constant. This constant corresponds to the component_value_length for a component in planar pixel representation, meaning that no further information is needed. For a component in packed pixel representation, the constant is signaled. The main difference with the previous embodiment is that the syntax element indicating the pixel representation is no more present at the level of the UncompressedVideoConfiguration, which may use the following syntax:

```
class UncompressedVideoConfiguration extends Box(uncC') {
   utf8string uncompressed_video_format;
   unsigned int(8) component_count;
   for (i = 1 ; i <= component_count ; i++){
      UncompressedVideoSampleComponent( )
   }
}
```

The UncompressedVideoSampleComponent includes additional information. The number and the length of the values of the component are still present. Additional syntax elements provide information on how to parse the component values in the media data box. This representation makes it possible to describe hybrid pixel representation, i.e. when planar and packed representations are both used.

```
class UncompressedVideoSampleComponent( ) {
   unsigned int(32) component_value_count;
   unsigned int(8) component_value_length;
   unsigned int(32) component_first_value_address;
   unsigned int(1) component_packed_flag;
   bit(7) reserved;
   if (component_packed_flag == 1) {
      unsigned int(16) component_next_value_offset;
   }
}
```

For each component, the UncompressedVideoSampleComponent box has the following semantics:
component_first_value_address is the address of the first value relatively to the sample address. That means that a value of 0 corresponds to the first bit of the sample in the media data box.
component_packed_flag equal to 0 indicates that all the values of the component are contiguous in the media data box. When equal to 1, it states that the values are packed with values of one or more components.
component_next_value_offset is an offset in bits (in one alternative, in bytes) from the address of the n-th value of the component to obtain the address of the n+1-th value. Typically, this value is an unsigned integer on sixteen bits. We refer to this information as the next value offset. This value indicates an offset between two consecutive component values.

In the following, an array variable with the same name as the items above is defined for which the i-th item corresponds to the item with the same name in the i-th UncompressedVideoSampleComponent structure of the UncompressedVideoConfiguration.

The media file parser may determine the address of the n-th value of the i-th component from the generic information provided in previously mentioned boxes as follows. The algorithm consists in determining the address of the first value of the i-th component. It is equal to the address in bits of the sample plus the address in bits of the first component as provided in UncompressedVideoSampleComponent structure of the i-th component. Then, the position of the next value is equal to the sum of this address in bits plus the value of the component_next_value_offset of the same structure. The same pattern applies for subsequent values: the address of the n-th value is equal to the address of the n−1-th value plus the next value offset.

```
component_value_address[i][0] = sample_start_offset[j] +
component_first_value_address[i]
for (n=1; n < component_value_count[i]; n++) {
   component_value_address[i][n] = component_value_address[i][n−1] +
   component_next_value_offset[i]
}
```

In a third variant of the third embodiment, the constraint of having a constant byte or bit offset between any two values of a given component is no more assumed. This means that these offsets values have to be signaled. In this alternative, the next value offset is an array that specifies the pattern of the next value offsets between two consecutive values of the component in the media data box order.

The UncompressedVideoSampleComponent box includes additional information with the following syntax for example:

```
class UncompressedVideoSampleComponent( ) {
   unsigned int(32) component_value_count;
   unsigned int(8) component_value_length;
   unsigned int(32) component_first_value_address;
   unsigned int(1) component_packed_flag;
   bit(7) reserved;
   if (component_packed_flag == 1) {
      unsigned int(32) component_next_value_offset_count;
      for (k = 1 ; k <= component_next_value_offset_count; k++){
         unsigned int(16) component_next_value_offset[k];
      }
   }
}
```

The media file parser may determine the address of the n-th value of the i-th component from the generic information provided in previously mentioned boxes as follows. The algorithm consists in determining the address of the first value of the i-th component that is equal to the address in bits of the sample plus the address in bits of the first component as provided in the UncompressedVideoSampleComponent structure of the i-th component. Then, the position of the next value is equal to the sum of this address in bits plus the value of the first value of the component_next_value_offset [0] of the same structure. The same pattern applies for subsequent values: the address of the n-th value is equal to the address of the n−1-th value plus the k-th next value offset with k equal to n modulo the component_next_value_offset_count value. This algorithm is equivalent to the following pseudo code:

```
k = 0;
component_value_address[i][0]= sample_start_offset[j] +
component_first_value_address[i]
for (n=1; n < component_value_count[i]; n++) {
   component_value_address[i][n] = component_value_address[i][n-1] +
component_next_value_offset[i][k++]
   if (k >= component_next_value_offset_count) {
      k = 0;
   }
}
```

In all the previous embodiments and their variants, the order of the component values for a given component was assumed to be the raster scan order of the picture. Typically, the raster scan order corresponds to the common scanning order of the picture starting on the top left of the picture and then going through each row of the picture from the left to the right starting from the topmost row. However, some sensors may provide data for which the starting point is the edge at the bottom right of the picture and rows are processed from right to left starting from the bottommost row. In an alternative of the two previous variant, the representation order of the components may be different from this raster scan order.

To describe these kinds of processing orders, the next offset values may be signed integers. As a result, the offset can be negative which makes it possible to scan the component from the media data box in a backward scan order inside the bitstream. The component_first_value_address then indicates the first value of the component in the raster scan order. For example, let's consider an uncompressed video containing a single component. The values of the component are provided starting from the bottom right edge of the picture. As a result, the first value in the media data box is the last value (i.e. the bottom right pixel) in processing order; and the last value in the media data box is the first value (i.e. the top left pixel) in processing order. In such a case, the component_first_value_address point to the last value in the mdat and the component_next_value_offset_count field indicates a negative offset value equal to minus the length of the value in bits.

In an alternative, the values of the components are not described in raster scan order of picture but rather in different zones. The scan of the components values follows the signaling order of the zone and within each zone, it is in the raster scan order of the zone. The number of zones used for one component are typically signaled in the generic information, i.e., typically in the UncompressedVideoSampleComponent structure. For each zone, the coordinates of the top left and bottom right corners of the zone are provided. The media file parser may thus determine to which zone the n-th value of a component belong to and therefore may determine the coordinates of the value relatively to this zone.

In an alternative, the rows or group of rows of the sample may be interleaved. For example, the bitstream first contains the values corresponding to the even rows, then the values corresponding to the odd rows. The signalling describes how the rows are split into different groups. For example, it may be signalled that a first group contains all the even rows and a second group contains all the odd rows. The signalling may also describe whether a group of rows may be shared by several samples or not. In a first example, the data corresponding to a first sample may be split into a first group of even rows and a first group of odd rows, and the data corresponding to a second sample may be split into a second group of even rows and a second group of odd rows. In another example, the data corresponding to a first sample may be split into a first group of even rows and a first group of odd rows, and the data corresponding to a second sample may be split into a second group of even rows and the first group of odd rows.

In a fourth embodiment, the generic description information that describes the uncompressed video sequence further defines information that facilitates the extraction of a subset of component values within an area of the picture.

In order to extract a set of values corresponding to a given area, the file parser needs information that permits to determine the coordinates of each value within the picture.

For an uncompressed video sequence that uses as many component values as pixels the association is quite straightforward: indeed the first value of each component is inferred at the coordinates (0, 0). And the N following values corresponds to the value on the first row with N equal to the picture width.

However, if the sampling rate of a component is different from the number of pixels, it is not possible to infer the location of the component value from the picture width and height only. For such kinds of uncompressed video sequences, the generic information further includes information allowing to determine the spatial position of each component values.

For example, the UncompressedVideoSampleComponent structure defines the vertical_sampling_rate and horizontal_sampling_rate syntax elements. The values of these items indicate the sampling rate of each component relatively to width and height of the picture. Typically, a horizontal sampling rate of 1 would indicate that within a row of the picture, a component value is provided for each pixel; while a horizontal sampling rate equal to 2 would indicate that a one component value is available every two pixels within a row of the picture. Same principle applies for vertical sampling rate on the column of the picture.

```
class UncompressedVideoSampleComponent( ) {
   ...
   unsigned int(8) vertical_sampling_rate;
   unsigned int(8) horizontal_sampling_rate;
   ...
}
```

The media file parser determines the x-axis and y-axis coordinates in the picture of the n-th value of the i-th component as follows:

component_value_x[i][n]=(n% ceil(sample_width/horizontal_sampling_rate[i]))*horizontal_sampling_rate[i]

component_value_y[i][n]=floor(n/ceil(sample_width/horizontal_sampling_rate[i])*vertical_sampling_rate[i]

The horizontal_sampling_rate[i] and vertical_sampling_rate[i] corresponds the values of horizontal_sampling_rate and vertical_sampling_rate of the i-th UncompresedVideosampleComponent structure within the UncompressedVideoConfiguration box.

The value of component_value_x[i][n] ranges from 0 to sample_width−1 and the value of component_value_y[i][n] ranges from 0 to sample_height−1.

The additional information provided in the generic description information allows to perform sub bitstream extraction of a spatial region within the picture.

In a variant of this embodiment, the spatial sampling position of each component value within a sample/picture is indicated using a bit matrix. This bit matrix describes these spatial sampling positions as a pattern. This enables to specify the spatial position of component values with a semi-regular sampling rate or with a sampling rate that varies for at least two row of pixels of the sample/picture. For example, it may be used to specify the spatial position of component values for an image generated by a sensor using a Bayer filter.

For example, the UncompressedVideoSampleComponent structure may contain the following additional fields:

```
class UncompressedVideoSampleComponent( ) {
    ...
    unsigned int(8) matrix_columns;
    unsigned int(8) matrix_rows;
    for (int k=0; k < matrix_columns * matrix_rows; k++) {
        unsigned int(1) matrix_present;
    }
    ...
}
```

The matrix_columns field indicates the number of columns in the bit matrix. For example in the case of a typical Bayer filter, the number of columns is 2.

The matrix_rows field indicates the number of columns in the bit matrix. For example in the case of a typical Bayer filter, the number of rows is 2.

Then for each element of the bit matrix, the matrix present flag indicates if the component defines a value for the corresponding spatial location. The pattern described by the bit matrix is repeated horizontally and vertically to allow determining whether the component data defines a value at any given location.

For example, for the YUV I420 format, the bit matrix may have 2 rows and 4 columns. For the Y component, all the matrix present flags are set to 1 to indicate that this component defines a value for all the pixels at the corresponding position in the picture. For the U and V components, only the first and third elements of the first row have the matrix present flag set to 1.

In another example, the size of the bit matrix corresponds to the size of the sample/picture. Thus, it may cover the whole image area to represent irregular sampling pattern.

The media file parser may determine the x-axis (represented by component_value_x[i][n] variable) and y-axis (represented by component_value_y[i][n] variable) coordinates in the picture of the n-th value of the i-th component using the following algorithm, where matrix[i][c, r] is the value of matrix_present field at column c and row r in the bit matrix of the i-th component.

```
matrix_column = 0;
matrix_row = 0;
x = 0;
y = 0;
n = 0;
while (y < sample_height) {
    if (matrix[i][matrix_column, matrix_row] == 1) {
        component_value_x[i][n] = x;
        component_value_y[i][n] = y;
        n++;
    }
    matrix_column++;
    if (matrix_column == matrix_columns[i]) {
        matrix_column = 0;
        matrix_row++;
        if (matrix_row == matrix_rows[i]) {
            matrix_row++;
        }
    }
    x++;
    if (x == sample_width) {
        x = 0;
        y++;
    }
}
```

In a variant, a single matrix is signalled and applies to all the components of the sample. This combined matrix may be stored in the UncompressedVideoConfiguration box.

In a variant, a single matrix is signaled and each value of the matrix is a field of bits, with one bit associated to each component of the sample. This combined matrix may be stored in the UncompressedVideoConfiguration box.

In another variant of the fourth embodiment, the vertical_sampling_rate and/or the horizontal_sampling_rate may be array of integers, which allows representing a non-regular sampling rate. For example, the horizontal_sampling_rate may be the array [2, 3], signalling that the sampling pattern is the following: the component data defines a value for the first and third pixels of a pixel row and doesn't define a value for the second, fourth and fifth pixel of the same raw. Then, the same pattern applies for the subsequent pixels of the row: the component data defines a value for the sixth and eighth pixels of the row but not for the seventh, ninth and tenth pixels of the row.

Alternatively, the vertical_sampling_rate and/or the horizontal_sampling_rate may be float values or fixed decimal values to represent non-integer sampling rates.

In a variant, an offset is associated to the vertical_sampling_rate and/or the horizontal_sampling_rate allowing the sampling for the component to start at a different position than the first row or first column of the picture. For example, an horizontal_sampling_rate value of 2 with an associated offset of 1 signal that the horizontal sampling starts on the second column and continues every other column, i.e., the fourth, the sixth . . . .

Alternatively, a list of horizontal_sampling_rates and possibly of horizontal offsets is signalled for a component, allowing different horizontal sampling patterns for different rows. These horizontal_sampling_rate values and horizontal offsets are used in turn and repeated until the last row. For example if the vertical_sampling_rate is 2 and the horizontal_sampling_rate values are 2 and 3, the component data defines a value for the first and third pixels in the first row and so on for the following pixels in the row. In the second row, the component data defines no values for any pixels. In the third row, it is defined values for the pixels numbered first, fourth, seventh and so on. In the fourth row, no values are defined for any pixels. Then for the fifth row, the first horizontal_sampling_rate value is used again.

Alternatively, the vertical_sampling_rate and/or the horizontal_sampling_rate may be a list of values allowing for a variable sampling rate between different frames. Possibly, several bit matrices may be signalled to allow a variable sampling pattern between different frames.

The features of all these alternatives may also be mixed.

In all the previous embodiments, it was assumed that the media data box comprises only the raw video data. It may happen that uncompressed video sequences comprise additional information describing the content of the sample or of a component. This additional information is typically metadata e.g. description of the sample content or proprietary information describing the model of the sensor and is at different location in the bitstream. Typically, this additional information may be present at the beginning of a sample or a component. It can also be located after the data corresponding to the sample or to the component.

In a fifth embodiment, the generic description information includes information indicating the presence and the size of a prefix, and/or suffix at the level of the sample and/or at the level of a component.

For the information at sample level, the UncompressedVideoConfiguration box may signal the characteristics of the prefix and or suffix, for example, with the following syntax:

```
class UncompressedVideoConfiguration extends Box('uncC') {
    ...
    unsigned int(1) sample_prefix;
    if (sample_prefix == 1) {
        unsigned int(1) sample_skip_prefix;
        bit(7) reserved;
        unsigned int(32) sample_prefix_size;
    }
    else {
        bit(7) reserved
    }
    unsigned int(1) sample_suffix
    if (sample_suffix == 1) {
        unsigned int(1) sample_skip_suffix;
        bit(7) reserved;
        unsigned int(32) sample_suffix_size;
    }
    else {
        bit(7) reserved
    }
    ...
    for (i = 1 ; i <= component_count ; i++){
        UncompressedVideoSampleComponent( )
    }
}
```

The UncompressedVideoSampleComponent box may define the prefix and suffix at the component level with the following syntax:

```
class UncompressedVideoSampleComponent( ) {
    unsigned int(1) component_prefix;
    if (component_prefix == 1) {
        unsigned int(1) component_skip_prefix;
        bit(7) reserved;
        unsigned int(32) component_prefix_size;
    }
    else {
        bit(7) reserved
    }
    unsigned int(1) component_suffix
```

-continued

```
    if (component_suffix == 1) {
        unsigned int(1) component_skip_suffix;
        bit(7) reserved;
        unsigned int(32) component_suffix_size;
    }
    else {
        bit(7) reserved
    }
}
```

The syntax of the prefix and suffix at the sample or component level uses the same elements:
  A flag indicates if the suffix (or prefix) is present at the concerned level
    component_suffix (or component_prefix) for the components
    sample_suffix (or sample_prefix) for the sample
  When the flag is equal to 1, the size in bits (or bytes) of the suffix (or prefix) is provided as an unsigned integer.
    component_suffix_size (or component_prefix_size) for the components
    sample_suffix size (or sample_prefix_size) for the sample
  When the flag is equal to 0, there is no suffix (or prefix) and the size of the suffix (or prefix) is inferred to be equal to 0.

In an alternative, represented in the above example, a flag indicates whether the parser should skip the data of the prefix (or suffix) when extracting the component.
  component_skip_suffix (or component_skip_prefix) for the components
  sample_skip_suffix (or sample_skip_prefix) for the sample A media file parser has to offset the start address of the sample or component when a prefix is present in the sample. For instance, for embodiment 1 with prefix and suffix information at the sample level the following algorithm may be used when the component representation is planar. The size of the component determined from the sample size is therefore decreased by the size of the prefix and suffix.

component size=(sample_size*8−sample_prefix_size−sample_suffix_size)/component_count When components also include suffixes and/or prefixes their sizes must be subtracted from the sample_size value to compute the component_sizes.

The start address of each component depends on the representation format. If a planar representation is used, the first value of the i-th component is equal to the bit location of the j-th sample (sample_start_offset[j]) plus the product of i and of the component_size:

The start address of the i-th component takes into account the size of the sample prefix and may be computed according to:

component_start_address[$i$]=sample_start_offset[$j$]+sample_prefix_size+$i$*component_size When components also include suffixes and prefixes, the suffix and prefix sizes of the component prior to the current component must be added to the component size start address, plus the prefix size of the current component.

The same principle applies also for packed representations. For some of the other embodiments, since the address of the first value of the component and the offset are made relatively to the start address of the sample, the media sample has no need to offset the address to take into account the presence of prefix and/or suffix information.

In a variant of all the previous embodiments, a flag is present in the generic description information indicating whether the component is a colored component or not. This makes it possible for the file parser to determine and to extract only the components that encode image data. Therefore, the parser is able to ignore components that define other types of data such as transparency information for example.

In another variant of all previous embodiments, a flag is present in the generic description information indicating whether the component is essential (meaning that the parser must extract systematically the component by default) or if it is supplemental or optional (meaning that the parse may ignore the component unless explicitly requested). For instance, in an RGB sequence with transparency component, the R, G and B components may be set as essential while the transparency component is supplemental.

In another variant of all previous embodiments, a syntax element is introduced for signalling the format of one or more components. The format of the component is indicative of the type of the component. For example, the format may indicate that the component corresponds to Luma (Y) values of a YUV video sequence.

The syntax of the UncompressedVideoSampleComponent may contain the following additional syntax elements (in bold):

```
class UncompressedVideoSampleComponent( ) {
    unsigned int(32) component_value_format;
    ...
    unsigned int(32) component_value_count;
    unsigned int(8) component_value_length;
    ...
}
```

The component_value_format field is introduced to specify the type of the component. The purpose of this field is to describe the content of the component format.

In an example, the values in the range 0 to 65535 are reserved for component types defined by ISO standards and the values in the range 65536 to 4294967295 are available for proprietary component types.

In this example, the following table lists some possible predefined values as well as the reserved range and the available range.

| Value | Description |
| --- | --- |
| 0 | Grey level component |
| 1 | (Y) Luma component |
| 2 | (U) Chroma component |
| 3 | (V) Chroma component |
| 4 | (R) Red component |
| 5 | (G) Green component |
| 6 | (B) Blue component |
| 7 | (A) Alpha/transparency component |
| 8 | Depth component |
| 9 | Disparity component |
| 10 | Mask component |
| 11 | Thermal component |
| 12-65535 | Reserved for future definition |
| 65536-4294967295 | Unrestricted values for user definition |

In this example, the component_value_format (or component_value_type) field is represented as a 32-bit integer. Alternatively, it may be specified as 16- or 8-bit integer or any other coded representation such as a string of characters. The other syntax elements have the same semantics as in previous embodiment. Other syntax elements not represented may also be present in the generic information associated with the component.

With the help of the component format information (e.g. the component_value_format or component_value_type) included in the generic information, a parser is able to determine the type of each component and may then select a subset of the components according to the needs of the application. For example, it can retrieve the red, green and blue components to display the image or video. As another example, it can extract only the luma component of an uncompressed video sequence by determining the component which has a format corresponding to the luma component. In the case of the example table above, it typically corresponds to a value of the component_value_format field equal to 1. Another possibility is to extract only metadata component such as a mask component. The introduction of the component format information makes easier any high-level manipulation of these components by the parser.

In another variant of the third embodiment, the sampling rate information is represented as a fraction. The numerator and the denominator of the fraction may be signalled in the UncompressedVideoSampleComponent for example using the following syntax:

```
class UncompressedVideoSampleComponent( ) {
    ...
    unsigned int(1) sampling_present_flag;
    ...
    if (sampling_present_flag == 1) {
        unsigned int(16) vertical_sampling_rate_num;
        unsigned int(16) vertical_sampling_rate_denom;
        unsigned int(16) horizontal_sampling_rate_num;
        unsigned int(16) horizontal_sampling_rate_denom;
    }
    ...
}
```

The semantics of the syntax elements are the following:

The sampling rate is the ratio between the size of the component, given in component values, and the size of the frame, given in pixels (for example in the sample entry), horizontally or vertically. For example, a horizontal sampling rate of 2 for a frame width of 320 indicates that there are 160 values for each line of the frames of the component.

The sampling_present_flag field equal to 0 indicates the absence of the component sampling information, in this case, component is assumed to have the same size as the sample width and height, indicated for example in the sample entry. When equal to 1, it states that vertical_sampling_rate_num, vertical_sampling_rate_denom and horizontal_sampling_rate_num and horizontal_sampling_rate_denom are present. Of course, value 0 is forbidden for vertical_sampling_rate_denom and horizontal_sampling_rate_denom The vertical_sampling_rate_num field specifies the numerator of the vertical sampling rate of the component values relatively to the height of the sample. When not present (sampling_present_flag field equal to 0), the vertical_sampling_rate_num field is inferred equal to 1.

The vertical_sampling_rate_denom field specifies the denominator of the vertical sampling rate of the component values relatively to the height of the sample. When not present (sampling_present_flag field equal to 0), the vertical_sampling_rate_denom field is inferred equal to 1.

The horizontal_sampling_rate_num field specifies the numerator of the horizontal sampling rate of the component values relatively to the width of the sample. When not present (sampling_present_flag field equal to 0), the horizontal_sampling_rate_num field is inferred equal to 1.

The horizontal_sampling_rate_denom field specifies the denominator of the horizontal sampling rate of the component values relatively to the width of the sample. When not present (sampling_present_flag field equal to 0), the horizontal_sampling_rate_denom field is inferred equal to 1.

In a variant, the presence of the sampling_present_flag field is optional in the UncompressedVideoSampleComponent structure. When absent, the sampling_present_flag field is inferred equal to 1. The component values sampling is the same as the resolution of the uncompressed video sequence when all the four sampling rate parameters are equal to 1. In yet another variant, the sampling rate parameters (vertical_sampling_rate_num, vertical_sampling_rate_denom and/or horizontal_sampling_rate_num and horizontal_sampling_rate_denom) are signalled as float, or fixed-point decimal values. The number of bits for each parameter can be increased to provide additional precision for the sampling rates values; on the contrary, the number of bits can be decreased (e.g. to 8 bits) to reduce the size of the UncompressedVideoSampleComponent. In yet another alternative, the vertical_sampling_rate_denom field and the horizontal_sampling_rate_denom field may be optional with their presence or absence signalled by a flag. As well in another alternative, the presence of parameter for one sampling dimension (horizontal or vertical) is controlled by two flags (one for each dimension).

In another variant of all previous embodiments, the uncompressed video sequence may include padding data, for example at the end and/or at the beginning of each pixel row of the component. To allow a parser to determine that padding data is inserted within each pixel row, the generic information describing the uncompressed video sequence (e.g. as defined in the sample description boxes and sub-boxes) is modified to signal the presence and the characteristics (e.g. the size) of the padding data. This is indicating by a padding information that may be a box or a set of fields declared in an existing box. For example, the UncompressedVideoSampleComponent structure contains padding information having a padding_present_flag field to indicate the presence of padding data within the row of the component data. When padding_present_flag is equal to 1, the row of a component contains padding data. When padding_present_flag is equal to 0, the row of a component does not contain padding data. When padding data is present, the UncompressedVideoSampleComponent structure may further describe in the padding information the length of a component row including the padding data. For instance, the padding information contains a component_values_stride field indicating the length in component value units of a component row. Its value may be represented on 16 bits for consistency with sample width and height in the sample entry. From any given address (typically the first component value that can be indicated by the component_first_value_address field) of a component value within a row, the value of component_values_stride allows to skip to the component value that is in the same pixel column and in the next row. In practical, the address of the component value in the next row and in the same column is equal to the address of the current component value plus the component_values_stride (optionally converted in a number of bits or bytes). The length in bits of a row of component values including the padding data is equal to the product of the component_values_stride field value and the component_value_length field value. The length in bits of a row of component values without the padding data is equal to the number of component values per row multiplied by the value of component_value_length field. The size of the padding is the difference between these two values. Possibly, the length of a row of component values may be signalled as a number of bits or as a number of bytes instead of as a number of component values.

In an alternative, the UncompressedVideoSampleComponent indicates in the padding information a length that corresponds only to the length of the padding data in a row. (i.e. excluding the length of the component values). It may be expressed as a number of component values or in bits or in bytes. In another alternative, the padding information may contain a parameter indicating whether padding data is present at the beginning of the row of component values or/and at the end of the row of component values. When either padding before and/or after the component values in a row is present, the padding information contains a parameter indicating the size of the padding data. When both are present (i.e. padding data is used at the beginning and at the end of the component rows), the padding information contain parameters indicating the length of each data range.

In another alternative, when the one or more flags indicating the presence of padding data are not present in the generic information describing the samples of the uncompressed video sequence, the one or more flags are inferred equal to 1. The absence of padding data can be determined when the length of the padding data (excluding the length of the component values) is equal to 0.

For example, the UncompressedVideoSampleComponent syntax may contain the following syntax elements for padding information.

```
class UncompressedVideoSampleComponent( ) {
    ...
    unsigned int(1)   padding_present_flag;
    ...
    if (padding_present_flag == 1) {
        unsigned int(16) component_values_stride;
    }
    ...
}
```

With the following semantics:

The padding_present_flag field equal to 0 indicates the absence of padding information for the component. When equal to 1, it states that padding information is present.

The component_values_stride field is the stride of a component in a sample row in bytes. It corresponds to the sum of the width of the component values and of the width of padding data. For example, the padding data is assumed to be at the end of a row.

In another variant of the all the previous embodiments, the uncompressed video content may comprise one or more components with a particular endianness (i.e. big or little endian representation). The generic information describing the samples of the uncompressed video may comprise syntax elements that describes the endianness of all the components or of a single component. Typically, the UncompressedVideoConfiguration box may include a field (for example a flag) that when equal to 1 indicates that all the component values (for all the components described in the box) are coded using a big-endian representation. When equal to 0 it indicates that the coding representation is a little-endian representation.

To support uncompressed video sequences with endianness that varies among the different components, the information regarding endianness may be defined for each component, typically within the UncompressedVideoSampleComponent structure. For example, the syntax of this box may include the following elements:

```
class UncompressedVideoSampleComponent( ) {
    ...
    unsigned int(1)  big_endian;
    ...
}
```

Wherein the big_endian field equal to 0 indicates that the component values are stored using a little-endian order. When equal to 1, it states that the values are stored using a big-endian order. When the component_value_length field value is lower than eight, the information regarding endianness should be ignored.

In a variant, the presence of the information regarding endianness may be conditional to the value of component_value_length. In particular when the component_value_length is lower that or equal to 8, the information regarding endianness is not present.

In a further embodiment, the generic information describing samples of uncompressed video sequences may be used to describe a subset of the components present in the uncompressed video sequence. The uncompressed video sequence comprises a first set of components corresponding to a base format, while a second set of the components are represented by the generic representation of previous embodiments.

For instance, the uncompressed video sequence may contain, in the first set of components, color components (typically YUV components). The format of these three components is represented by an identifier of the base format, for example a specific code point value, i.e. a specific value recorded in a predetermined table that fully describes the format of the color components to allow interoperability (for example in Codec Independent Code Points specification ISO/IEC 23091-2 or in a registration authority). This format is the base format of the uncompressed video sequence. However, the uncompressed video sequence may also include a second set of components that cannot be described by the base format or list of registered codec independent code points. In other words, the uncompressed video sequence contains a first set of components represented by the base format and is extended with a second set of components that maybe called additional components. In such a case, the additional components (not described by the base format) are described using the generic representation as in the previous embodiments, the first set of components being only described by a code point. The second set of components can be seen as an extension point for predefined formats identified by code points. The second set of components may be called an extension set. This extension set allows to handle additional information related to registered formats; for example a depth map, disparity, alpha or transparency channels etc. This avoids defining a great number of code points each time predefined format gets extended with additional information, For example, the sample entry describing an uncompressed video sample with a based format and additional components may be the following:

```
class UncompressedVideoSampleEntry extends
VisualSampleEntry('uncv') {
    ExtendedUncompressedVideoConfiguration config;
}
class ExtendedUncompressedVideoConfiguration extends Box('eunC')
{
    unsigned int(32) base_format; // a code point value
    unsigned int(8)  additional_component_count;
    for (i = 1 ; i <= additional_component_count ; i++){
        UncompressedVideoSampleComponent( )
    }
}
```

The ExtendedUncompressedVideoConfiguration with 'eunC' 4CC (name and 4CC are just examples here) indicates that the samples associated with this box are composed of two sets of components. The first set of components has a pixel format represented by a base format identified for example by a code point. The second set corresponds to one or more additional components for which the pixel format is described by the generic information describing samples of uncompressed video sequence indicated in each UncompressedVideoSampleComponent structure associated with the additional components. When no indication is given on the relative data order between components of the first set and components of the second set for the samples of the uncompressed sequence, the data for additional components follow the data for the first of components.

The semantics of the syntax element is the following.

The base_format field is an identifier of a base format indicating the representation format of the first set of components. For example, the table below is indicative of the components present in the first set and also indicative of their representation in memory. Additional formats (not represented in the table) may be defined, in particular formats for which the components are packed.

| base_format | pixel format |
| --- | --- |
| 0 | Empty or Reserved |
| 1 | Monochrome planar 10 bits |
| 2 | YUV 4:2:0 planar 8-bits |
| 3 | YUV 4:2:2 planar 8-bits |
| 4 | YUV 4:4:4 planar 16-bits |
| 5 | RGB planar 12-bits |
| 6 | ... |

The additional_component_count field indicates the number of components in the second set of components within the sample of the video data. These additional components may have a different format than the first set of components but may also have the same format.

The format of additional components is represented by the UncompressedVideoSampleComponent according to any of the previous embodiments.

In a variant of this embodiment, the ExtendedUncompressedVideoConfiguration box may specify additional information for the first set of components. It can be for example, the endianness, the bit depth (i.e. the number of bits used for each component value) of the first set of components. In another variant, the ExtendedUncompressedVideoConfiguration may contain a parameter (for example a flag) that is equal to one when the data for the additional components are stored in the media data part of the file prior to the data for the first set of components. In that case, the parser determines the size in memory of the additional component to determine the start address of the first set of components in memory. In yet another variant, the UncompressedVideoSampleComponent may contain a field indicating that the information describing a component of the second set may override the information describing a component of the first set. For example, the generic information describing samples of an uncompressed video sequence may define a base_format indicated a YUV420 planar format. In addition, an additional component may describe information overriding the representation of the luma component. This overriding allows for example packing the luma component with another additional component (e.g. depth or alpha component).

In this variant, the generic information describing samples of an uncompressed video sequence may describe an overridden_component field in ExtendedUncompressedVideoConfiguration that is equal to 1 when information describing a component is overridden by the information associated with an additional component. An additional component that is overriding the information of a component of the first set has the same component type. Otherwise, when overridden_component field is equal to 0, there is no overriding.

In a variant, the generic information describing samples of an uncompressed video sequence may describe information for additional components and overridden components in the UncompressedVideoSampleComponent structures. In that case the additional_component_count field indicates the number of components in the second set of components plus the number of components overridden in the first set within the sample of the video data. The overridden_component field is described in the UncompressedVideoSampleComponent structure and applies to the associated component. When equal to 1, the UncompressedVideoSampleComponent information describes a component that overrides a component of the first sets. The index of the overridden component may be indicated in the UncompressedVideoSampleComponent information. In one alternative, the overridden component is the first (not yet overridden) component in the first set of component that has the same component type. Otherwise, when equal to 0, the UncompressedVideoSampleComponent information describes an additional component.

In another variant of this embodiment, the base_format field of the ExtendedUncompressedVideoConfiguration structure may refer to a format defined using a generic information describing the samples of the uncompressed video sequence (e.g. ExtendedUncompressedVideoConfiguration). In this variant, each format defined using a generic information contains a field, named for example format_id, to identify the format for referencing it from another format definition.

In yet another variant of this embodiment, several base formats may be combined together (e.g. in ExtendedUncompressedVideoConfiguration) with possibly some extension components.

In another embodiment, the uncompressed format may describe the component values using more advanced packing approaches. Typically, two or more component values in the data part of the file, pertaining to the same or to different components, are represented using separate sets of bits, which are then packed on one or more bytes.

FIG. 7 illustrates the first 3 bytes of an uncompressed video sequence that is represented using such kind of formats. In this example, these 3 bytes are used to store two values 700 and 701 of a same component or from different components that may be multiplexed. The bits that constitute each value are non-contiguous in memory and form two sets of bits for each value. The first value 700 is thus composed of the set of bits 700-1 and 700-2 and the second value 701 of the sets 701-1 and 701-2.

In a first example, values of the same component are packed. The values 700 and 701 correspond thus to different pixels of the same component. Pixels values are packed on 3 bytes for this example. Another possibility is that the values 700 and 701 correspond to the same pixel but to different components. In this case, two components are packed on 3 bytes. The item (or packing item) that has valued packed on several bytes can be either a component (when packed values are from different components) or a pixel (when packed values are from the same component).

The signalling of such uncompressed format needs a different approach (finer signalling) in order to properly describe the representation format of the samples of the uncompressed video sequence.

The principle of this embodiment consists in signalling patterns of packed values. A pattern of packed values is indicating the different sets of bits that form a component value. This pattern represents the association of the sets of bits with the appropriate pixel or component that is repeated to represent the component values of the sample. In other words, this association maps component values on bits of a set of bytes. The pattern, pattern of packed values or packing pattern or bit-mapping refers to the association of a set of component values with a set of bits.

In a first variant, the patterns of packed values are represented by a set of consecutive bytes. To each byte of the pattern is associated one or more packing item based on index values. A packing item can be for example a component (when packed values are from different components) or a pixel (when packed values are from the same component). The signalling of this pattern may be described in the UncompressedVideoSampleEntry; for example, with the following syntax:

```
class UncompressedVideoConfiguration extends Box('uncC') {
    utf8string uncompressed_video_format;
    unsigned int(8) component_count;
    for (i = 1 ; i <= component_count ; i++){
        UncompressedVideoSampleComponent( )
    }
    unsigned int(8)  packing_patterns_count;
    for (i = 1 ; i <= packing_patterns_count ; i++){
        PackingPattern( );
    }
}
```

As in several previous embodiments, the UncompressedVideoConfiguration defines the parameters of the uncompressed video sequence. Information applying to a specific component is provided in the corresponding UncompressedVideoSampleComponent. The new syntax elements are the number of packing patterns that are used in the samples of the uncompressed video.

The packing_patterns_count field specifies the number of packing patterns used by the samples associated with the sample entry.

The PackingPattern class describes the structure of the packing pattern and in particular a bit-mapping of the packing items in the pattern. This bit-mapping associates bits of the pattern with one or more packing items. For example, the syntax of the PackingPattern box may be the following:

```
class       PackingPattern( ) {
  unsigned int(8) num_bytes;
  unsigned int(1) single_component_flag;
  unsigned int(7) reserved = 0;
  unsigned int(8) num_packing_items_per_pattern; //Optional
  for (int i = 0; i < num_bytes; i++) {
          unsigned int(1) bit_sets_present_flag;
          if(bit_sets_present_flag == 1) {
            unsigned int(7) reserved = 0;
            unsigned int(8) packing_item_index;
          }
          else {
            unsigned int(4) reserved = 0;
            unsigned int(3) num_bit_sets_minus1[i];
            for (int j= 0; j <= num_bit_sets_minus1[i]; j++)
   {
                unsigned int(3) num_bits_minus1[i][j];
                unsigned int(1) lsb_flag[i][j];
                unsigned int(4) reserved = 0;
                unsigned int(8) bitset_item_index[i][j];
            }
          }
      }
   }
}
```

The num_bytes field specifies the number of bytes that constitute the packing pattern.

The num_packing_items_per_pattern field specifies the number of packing items present in the pattern.

The single_component_flag field equal to 1 indicates that the pattern applies to a single component of the uncompressed sequence. In this case, the packing applies to component values of the same component and thus the packing item is a pixel.

Otherwise, the single_component_flag field equal to 0 it indicates that the packing applies to values of at least two components and thus the packing items are component values.

The bit_sets_present_flag field equal to 0 indicates that all the bits of the i-th byte of the pattern are associated with a single item (i.e. all the eight bits are associated with a single pixel or single component value, depending on single_component_flag's value).

The bit_sets_present_flag field equal to 1 indicates that at least one of the eight bits are associated with a first item and at least one of the eight bits is associated with a second item. Some bits may be associated with other items.

The packing_item_index field indicates the index of the packing item that is associated with the byte. When the packing item is a component (single_component_flag field equal to 0) it corresponds to an index of a component as defined in the UncompressedVideoConfiguration box. When the packing item is a pixel (single_component_flag field equal to 1) it corresponds to the index of the pixel in the packing pattern.

The num_bit_sets_minus1[i] field plus 1 specifies the number of sets of bits present in the i-th byte of the packing pattern.

The num_bits_minus1[i][j] field plus 1 specifies the number of bits in the j-th set of bits of the i-th byte of the packing pattern.

The lsb_flag[i][j] field equal to 0 indicates that the j-th set of bits corresponds to the most significant bits of the component value of the packing item with index equal to bitset_item_index[i][j]; lsb_flag[i][j] equal to 0 indicates that the j-th set of bits corresponds to the least significant bits of the component value of the packing item with index equal to bitset_item_index[i][j].

The bitset_item_index[i][j] field indicates the index of the packing item that is associated with the j-th sets of bits of the i-th byte. When the packing item is a component (single_component_flag field equal to 0) it corresponds to an index of component as defined in the UncompressedVideoConfiguration box. When the packing item is a pixel (single_component_flag field equal to 1) it corresponds to the index of the pixel in the packing pattern.

When packing patterns are used, the indication of the offset to the next component value (e.g. represented by component_next_value_offset syntax element) may be inferred from the packing pattern and thus is not signalled in the sample entry.

In a variant, the UncompressedVideoSampleComponent may include a component_values_packed_flag field that is equal to 1 when a packing pattern applies to the component. In other words, the locations of the bits of the component values are described by a packing pattern. When equal to 0, it indicates that the component is not associated with a packing pattern. In other words, all the bits of the component values are consecutive in memory. This information allows a parser to determine the components with packed values instead of having to parse the PackingPattern information.

In yet another variant, an uncompressed video format may use several different packing patterns for two distinct sets of components. In that case, several instances of the PackingPattern class may be present in the sample entry, one for each packing pattern.

An optional identifier may be associated to each of the packing patterns information. This identifier may be referenced in the UncompressedVideoSampleComponent in order to simplify the identification of the components that are concerned by packing patterns information.

Possibly the PackingPattern class employs a lower number of fields to describe an uncompressed video sequence format with a constrained packing format for the component values.

In one alternative, the packing pattern may be described in the UncompressedVideoSampleComponent structure using the following structure.

```
Class PackingPattern( ) {
    unsigned int(1) same_component;
    unsigned int(1) packed_bit_lsb;
    if (same_component == 1) {
       unsigned int(4) packed_count_minus1;
       unsigned int(4) packed_byte_location;
       for (int i=1; i <= packed_count; i++) {
          unsigned int(8) packed_bit_location[i];
       }
    }
    else {
       signed int(8) packed_byte_offset;
       unsigned int(8) packed_bit_location;
    }
}
```

The same_component field equal to 1 indicates that the packing pattern packs bits for a single component. When this field is equal to 1, it indicates that the packing pattern packs bits for different components.

The packed_bit_lsb field equal to 1 indicates that the least significant bits of the value are packed. When this field is equal to 0, it indicates that the most significant bits of the value are packed.

When the packing pattern is for a single component (same_component field equal to 1), the packed_count, packed_byte_location and packed_bit_location[i] fields are present, otherwise they are absent.

The packed_count_minus1 field plus 1 indicates the number of component values for which some bits are packed together.

The packed_byte_location field indicates the location of the byte containing the packed bits. The value 0 indicates that this byte is before the value of the first packed component, the value 1 indicates that this byte is after the value of the first packed component The packed_bit_location[i] field indicates the location of the bits associated with the $i^{th}$ packed component value inside the byte containing the packed bits. The range value for this field is 0 . . . 7 inclusive. The value of the packed bits are equal to:

(Packed_byte>>packed_bit_location[$i$])&(2^(component_value_length %8)–1), wherein
Packed_byte is the a variable equal to the value of the byte at packed_byte_location.

When a packing pattern for several different components (same_component field equal to 0), the packed_byte_offset and packed_bit_location fields are present, otherwise they are absent.

The packed_byte_offset field indicates the location of the byte containing the packed bits as an offset from the component value.

The packed_bit_location field indicates the location of the bits associated with the $i^{th}$ packed component value inside the byte containing the packed bits. The range value for this field is 0 . . . 7 inclusive. The value of the packed bits are equal to:

(Packed_byte>>packed_bit_location[$i$])&(2^(component_value_length %8)–1), wherein
Packed_byte is the a variable equal to the value of the byte at packed_byte_location.

Two uncompressed video contents may share the same format but the characteristics of the content may differ. For this reason, the sample entry describing the uncompressed video format may contain optional boxes that precise the characteristics of the uncompressed format. These optional boxes may be defined either for all the components or per component (for example defined in the UncompressedVideoSampleComponent structure).

When a component contains depth information it may differ from one content to another, even if the same uncompressed video format is used. In particular, the characteristics of the depth information may differ. For this reason, the sample entry describing the uncompressed video format may contain optional boxes that further detail the characteristics of the depth information.

When depth content is stored, it can be stored as a disparity map or as a depth map. In case of disparity map, information to help a parser or an application to compute the depth (e.g., baseline distance between the camera sensors, focal length) is provided in optional boxes. In the case of the depth, it is possible that the coded samples do not represent directly the depth, and that an affine transformation (consisting in an offset or/and a scaling factor) is required to get the actual depth.

For example, a DisparityInfoBox may define information on disparity parameters for disparity component and/or a DepthInfoBox information on depth parameters for depth and/or disparity components. The following syntax is an example of parameters that further specify the characteristics of the uncompressed video sequence.

```
class DisparityInfoBox extends FullBox('disI', 0, 0) {
    unsigned int(32) camera_baseline;
    unsigned int(32) focal_length;
}
class DepthInfoBox extends FullBox('depI', 0, 0) {
    unsigned int(32) depth_offset;
    unsigned int(32) depth_scaling_factor;
}
```

Wherein camera_baseline is a 16.16 fixed-point number representing the distance between cameras in meters for the disparity map.

focal_length is a 16.16 fixed-point number representing the focal distance of the camera in meters for the disparity map.

In a variant, the DisparityInfoBox may specify the intrinsic and/or extrinsic parameters of the cameras that have computed the disparity component values.

depth_offset and depth_scaling_factor are 16.16 fixed-point numbers representing the affine transform to apply to the depth value to convert it to meters, i.e. the depth in meters of a component value stored in componentValue variable for a depth component is equal to the depth offset plus the product of the depth scaling factor multiplied by the componentValue and divided by the maximum depth value (represented by maximum_depth_value variable). The maximum depth value is the maximum number that can be represented by the component value. For example, it is equal to 2^component_value_length bits when component_value_length is in bits.

The Depth(componentValue) function represents the depth value of a componentValue. When the component is a disparity map, the Depth(componentValue) is equal to camera_baseline*focal_length/componentValue. When the componentValue is from a depth component, Depth(componentValue) is equal to componentValue.

Finally, the depth in meters of a given value of disparity or depth component can be determined by the following equation:

depth_in_meters=depth_offset+ depth_scaling_factor*Depth(componentValue)/Depth(maximum_depth_value). It is to be noted that DisparityInfoBox or DepthInfoBox may alternatively be defined as inheriting from FullBox which would allow versioning and possible future extensions.

Another type of information that can differ for the same uncompressed video format is the chroma location for color components (e.g. YUV or RGB components). The chroma location can be specified in particular when the sampling rate between the color components is different. The chroma location may differ from one content to another, even if the same pixel format is used. There are two possible alternatives. First alternative is to define different uncompressed formats (e.g. different value of uncompressed_video_format or component_value_format) for each chroma location type. Another alternative is to provide a ChromaLocationBox in the sample entry (e.g. UncompressedVideoSampleEntry 'uncv') that describes the chroma location type.

For example, the syntax of this box can be the following:

```
class ChromaLocationBox extends Box('cloc') {
    unsigned int(5) reserved = 0b00000;
    unsigned int(3) Chroma420SampleLocType;
}
```

If ChromaLocationBox is not present in the sample entry, the chroma location is unknown or specified by external means.

Chroma420SampleLocType is indicative of the chroma location. Typically, it can take the values with corresponding semantics defined in ISO/IEC 23091-2. It is to be noted that ChromaLocationBox may alternatively be defined as inheriting from FullBox which would allow versioning and possible future extensions.

In a variant, it is specified the relative sampling location of one or more components (including components that are not color components). For example, the ComponentLocationBox is a box with parameters indicative of the location of a component relatively to the others. A reference component for the location is specified and the location of the component relatively to this reference component are specified using, for example, the same location type indicator as in ISO/IEC 23091-2. For example, the syntax of the ComponentLocationBox is the following:

```
class ComponentLocationBox extends Box('colo') {
    unsigned int(8) component_loc_count;
    unsigned int(8) ref_component_loc_idx;
    for (i = 1 ; i <= component_count ; i++){
        unsigned int(8) component_index;
        ChromaLocationBox( )
    }
}
``` component_loc_count indicates the number of components for which the sampling location is indicated relatively to the reference component ref component_loc_idx is the index of the component that is used as reference for indication the sampling locations of the components component index specifies the index of the components which sampling location is described by the associated ChromaLocationBox( ). It is to be noted that ComponentLocationBox may alternatively be defined as inheriting from FullBox which would allow versioning and possible future extensions.

In one alternative, the reference component for the sampling location is indicated by parameter (for example a flag) in the UncompressedVideoSampleComponent structure. When equal to 1, this parameter indicates that the component is a reference. Otherwise, when equal to 0, this parameter indicates that the UncompressedVideoSampleComponent may include an optional ChromaLocationBox( ) that indicates the sampling position of the component relatively to the reference component. When the number of reference components is at least two, the UncompressedVideoSampleComponent may include a reference to the index of the component that is use as reference for the sampling location of the component values.

The interlaced nature of the content may not be dependent of the uncompressed video format used. Each frame of an interlaced video contains two fields. For example, one field contains the odd rows (or scan line) of a component. The second field contains the even rows. A box defining an interlacing information indicating how the content of a component is interlaced can be defined in the UncompressedVideoConfiguration for example with the following syntax:

```
class InterlacedContentTypeBox extends Box('fiel') {
    unsigned int(8) field_count; //1 or 2
    unsigned int(8) field_ordering;
}
``` field_count specifies the number of interlaced fields present in the component. When the field count is 2, field_ordering specifies which field contains the topmost scan-line, which field should be displayed earliest, and which is stored first in each sample. Each sample consists of two distinct images, each coding one field: the field with the topmost scan-line, T, and the other field, B. The following defines the permitted variants:

0—There is only one field.
1—T is displayed earliest, T is stored first in the file.
6—B is displayed earliest, B is stored first in the file.
9—B is displayed earliest, T is stored first in the file.
14—T is displayed earliest, B is stored first in the file.

It is to be noted that InterlacedContentTypeBox may alternatively be defined as inheriting from FullBox which would allow versioning and possible future extensions.

Uncompressed video sequence may pack pixels of several frames within the same sample. Typically, stereoscopic contents have two pictures for the same sample, one for the left view and another one for the right view. Frame packing allows to combine these two pictures into a single picture by rearranging the pixels in each sample according to a pattern. The frame packing nature of the content is not dependent of the uncompressed video format. A box (or a FullBox) defining how multiple frames are packed in a sample can be defined in the UncompressedVideoConfiguration, for example with the following syntax:

```
class FramePackingInfoBox extends FullBox('pack', 0, 0) {
    unsigned int(4) video_frame_packing;
    unsigned int(4) PackedContentInterpretationType
    unsigned int(1) QuincunxSamplingFlag;
    unsigned int(7) reserved = 0;
}
```

The semantics of the video_frame_packing (in particular the pattern for rearranging the pixels in the samples), QuincunxSamplingFlag, PackedContentInterpretationType take the same values with their corresponding semantics as defined in ISO/IEC 23091-2. For example, the video_frame_packing indicates the type of packing arrangement used in video frames (e.g. side-by-side, top-to-bottom or other types of arrangement . . . ). QuincunxSamplingFlag indicates whether a quincunx sampling structure is used in the frame packed video representation. PackedContentInterpretationType indicates the intended interpretation of the constituent frames (e.g. in a side-by-side packing arrangement, it indicates whether the frame on the left of the packing arrangement is the left view or the right view).

The additional boxes as previously defined can be present at different levels in the UncompressedVideoSampleEntry sample entry. When defined in the UncompressedVideoSampleComponent (or within the for loop on the components), the information of the additional boxes applies only to the corresponding component. Otherwise, the information boxes may apply to all the components of the uncompressed video sequence.

For example, the syntax of the UncompressedVideoSampleEntry may be the following:

```
class UncompressedVideoSampleEntry extends
  VisualSampleEntry('uncv') {
    UncompressedVideoConfiguration config;
    // Additional boxes
    DisparityInfoBox disparity; // Optional
    DepthInfoBox depth; // Optional
    ChromaLocationBox chromaLocation; // Optional
    InterlacedContentTypeBox interlacedContentType; // Optional
    FramePackingInfoBox framePacking; // Optional
  }
```

Wherein the fields have the following semantics:

The disparity field specifies the disparity information associated with the components specifying disparity values.

The depth field specifies the depth information associated with the components specifying depth or disparity values.

The chromaLocation field specifies the chroma location information associated with the color components.

The interlacedContentType field specifies the disparity information associated with the color components.

The framePacking field specifies the frame packing information associated with color components.

Instead of being defined in the highest level of UncompressedVideoSampleEntry, the additional boxes may be defined in the UncompressedVideoConfiguration as represented in the following example:

```
class UncompressedVideoConfiguration extends Box('uncC') {
    utf8string uncompressed_video_format;
    unsigned int(8) component_count;
    for (i = 1 ; i <= component_count ; i++){
        UncompressedVideoSampleComponentBox
    component[i];
    }
    // Additional boxes
    DisparityInfoBox disparity; // Optional
    DepthInfoBox depth; // Optional
    ChromaLocationBox chromaLocation; // Optional
    InterlacedContentTypeBox interlacedContentType; // Optional
    FramePackingInfoBox framePacking; // Optional
}
```

The component[i] field specifies information pertaining to the i-th component of the uncompressed video sequence. The semantics of the other fields remain unchanged.

When defined per component, the syntax of the UncompressedVideoSampleComponent may be the following:

```
class UncompressedVideoConfiguration extends Box('uncC') {
  utf8string uncompressed_video_format;
  unsigned int(8) component_count;
  for (i = 1 ; i <= component_count ; i++){
     UncompressedVideoSampleComponentBox component[i];
     // Additional boxes
     DisparityInfoBox disparity[i]; // Optional
     DepthInfoBox depth[i]; // Optional
     ChromaLocationBox chromaLocation[i]; // Optional
     InterlacedContentTypeBox interlacedContentType[i]; // Optional
     FramePackingInfoBox framePacking[i]; // Optional
  }
}
aligned(8) class UncompressedVideoComponentBox ( ) extend FullBox
('uvct', 0, 0)
{
  UncompressedVideoSampleComponent( );
}
```

Wherein the fields have the following semantics:

The component[i] field specifies information pertaining to the i-th component of the uncompressed video sequence The disparity[i] field specifies the disparity information associated with the i-th component.

The depth[i] field specifies the depth information associated with the i-th component.

The chromaLocation[i] field specifies the chroma location information associated with the i-th component.

The interlacedContentType[i] field specifies the disparity information associated with the i-th component.

The framePacking[i] field specifies the frame packing information associated with the i-th.

UncompressedVideoComponentBox is a box or a full box that contains the parameters of the generic information describing one component of the uncompressed video sequence samples.

Frame packing, interlaced content, disparity and depth information provide additional information for the content of one or more components that may differ between two uncompressed video with the same format. Any information that relates to one or more components and that may differ for two uncompressed videos that share the same format (for example, they have the same generic information describing the uncompressed video) is described as additional and optional boxes in the generic information describing the uncompressed video sample entry.

In one example of combination of previous embodiments, the content of the generic information of the media sequence is represented as an uncompressed video sample entry.

The uncompressed video sample entry allows describing uncompressed video samples that are composed of one or more components. RGB or YUV formats are typical examples of such uncompressed video samples for which each color component is a component of the uncompressed video sample. Other component types that associate a value with one or more pixels of the sample can also be described. For example, disparity or depth, transparency, infra-red or thermal values are other types of components.

An example of syntax may be the following:

```
class UncompressedVideoSampleEntry extends
VisualSampleEntry('uncv') {
   UncompressedVideoConfiguration config;
}
class UncompressedVideoConfiguration extends Box('uncC') {
   utf8string uncompressed_video_format;
   unsigned int(8) component_count;
   for (i = 1 ; i <= component_count ; i++){
      UncompressedVideoSampleComponent( )
   }
}
class UncompressedVideoSampleComponent( ) {
unsigned int(32)      component_value_format;
unsigned int(32)      component_value_count;
unsigned int(8)       component_value_length;
unsigned int(32)      component_first_value_address;
unsigned int(1)       big_endian;
unsigned int(1)       component_packed_flag;
unsigned int(1)       sampling_present_flag;
unsigned int(1)       padding_present_flag
bit(4) reserved = 0;
if (component_packed_flag == 1) {
   unsigned int(16) component_next_value_offset;
}
if (sampling_present_flag == 1) {
   unsigned int(16) vertical_sampling_rate_num;
   unsigned int(16) vertical_sampling_rate_denom;
```

-continued

```
    unsigned int(16) horizontal_sampling_rate_num;
    unsigned int(16) horizontal_sampling_rate_denom;
  }
  if (padding_present_flag == 1) {
    unsigned int(16) component_stride;
  }
}
```

Wherein the semantics would be: uncompressed_video_format specifies the type of the coding format used for the uncompressed video sequence. The purpose of this field is purely informative and is not to be used by the parser to determine the properties of the uncompressed video data format. In other words, the parser is not supposed to use the content of this field to determine how to parse the media data.

component_count indicates the number of components in each sample of the video data.

component_value_format specifies the type of the component. The purpose of this field is to describe the content of the component format. As an example, it may use the following values:

The values in the range 0 to 65535 are reserved for ISO representation and the range 65536 to 4294967295 are available for proprietary component types.

| Value | Description |
| --- | --- |
| 0 | Grey level component |
| 1 | (Y) Luma component |
| 2 | (U) Chroma component |
| 3 | (V) Chroma component |
| 4 | (R) Red component |
| 5 | (G) Green component |
| 6 | (B) Blue component |
| 7 | (A) Alpha/transparency component |
| 8 | Depth component |
| 9 | Disparity component |
| 10 | Mask component |
| 11 | Thermal component |
| 12-65535 | Reserved for future definition |
| 65536-4294967295 | Unrestricted values for user definition | component_value_count indicates the number of component values in a sample for the given component.

component_value_length indicates the number of bits of a component value.

component_first_value_address is the address of the first component value relatively to the sample address.

big_endian equal to 0 indicates that the component values are stored using little-endian order. When equal to 1, it states that the values are stored using big-endian order. When the component_value_length is lower than eight, the value of this flag should be ignored.

component_packed_flag equal to 0 indicates that all the values of the component are contiguous in the media data box. When equal to 1, it states that the values are packed with values of one or more components.

sampling_present_flag equal to 0 indicates the absence of the component sampling information. When equal to 1, it states that vertical_sampling_rate_num, vertical_sampling_rate_denom, horizontal_sampling_rate_num and horizontal_sampling_rate_denom are present.

padding_present_flag equal to 0 indicates the absence of component padding information. When equal to 1, it states that padding information is present.

component_next_value_offset is an offset, in bits, from the address of the n-th value of the component to obtain the address of the n+1-th value. This value indicates an offset between two consecutive component values.

vertical_sampling_rate_num specifies the numerator of the vertical sampling rate of the component values relatively to the height of the sample (for example declared in the sample entry). When not present (sampling_present_flag equal to 0), vertical_sampling_rate_num is inferred equal to 1.

vertical_sampling_rate_denom specifies the denominator of the vertical sampling rate of the component values relatively to the height of the sample (for example declared in the sample entry). When not present (sampling_present_flag equal to 0), vertical_sampling_rate_denom is inferred equal to 1. Value 0 is forbidden.

horizontal_sampling_rate_num specifies the numerator of the horizontal sampling rate of the component values relatively to the width of the sample (for example declared in the sample entry). When not present (sampling_present_flag equal to 0), horizontal_sampling_rate_num is inferred equal to 1.

horizontal_sampling_rate_denom specifies the denominator of the horizontal sampling rate of the component values relatively to the width of the sample (for example declared in the sample entry). When not present (sampling_present_flag equal to 0), horizontal_sampling_rate_denom is inferred equal to 1. Value 0 is forbidden.

component_stride is the stride of a component in a sample row. It corresponds to the sum of the width of the component values and the padding width.

In all the variants, the size of the different fields may be different. They also may depend on one or more flags for allowing variable field sizes.

In all the variants, some fields present in the UncrompressedVideoSampleComponent box may be moved into the UncompressedVideoConfiguration box, enforcing the same value for all the components. Possibly a default value may be provided in the UncompressedVideoConfiguration box with an optional field to override it in the UncrompressedVideoSampleComponent box.

The described embodiments may be combined if necessary according to the kind of constraints assumed in the format of the uncompressed video sequence.

In another embodiment, the generic information describing samples of an uncompressed video sequence contains syntax element that represent three main characteristics of uncompressed video format: the characteristic of the component types present in the sequence; the characteristic of the packing format of the component values; and the characteristic of component sampling. For example, a YUV 4:2:0 and a YUV 4:4:4 format video sequences have the same set of components and thus have the same values for the syntax elements representing the component characteristic. RGB 4:4:4 and YUV 4:2:0 sequences for which components are not packed (i.e. a planar representation is used) have the same code point values for the syntax element representing the packing format characteristic. YUV 4:2:0 and an RGB 4:2:0 sequences share the same component sampling format.

In a first variant of this embodiment, the generic information may have the following syntax:

```
class UncompressedVideoConfiguration extends Box('uncC') {
    unsigned int(32) uncompressed_video_format;
    unsigned int(8) component_value_length;
    unsigned int(2) component_count;
    unsigned int(3) component_sampling_type;
    unsigned int(1) big_endian
    unsigned int(2) reserved;
    unsigned int(8) packing_type;
}
```

The uncompressed_video_format syntax element represents the characteristics of the component types. It indicates a 4CC code that specifies the components present in the tracks. For example, the following table is a non-exhaustive list of 4CC codes that represents various component types. In this variant, the uncompressed_video_format syntax element specifies not only the list of component types present in the format but also the coding order of the components. A first uncompressed video with 'yuv0' 4CC for uncompressed_video_format and a second video with the 'yvu0' contain the same components (i.e. Y, U and V components). However, the order of the U and V components is different in the samples of the two video sequences (U and V components are swapped).

| uncompressed_video_format | Description |
| --- | --- |
| mono | Monochrome format |
| yuv0 | YUV format |
| rgb0 | RGB format |
| yuva | YUV plus alpha format |
| yuvd | YUV format plus depth format |
| yuvD | YUV format plus Disparity format |
| yuva | RGB plus alpha format |
| yuvd | RGB format plus depth format |
| yuvD | RGB format plus Disparity format |
| luma | Y component |
| crb0 | U component |
| crr0 | V component |
| red0 | R component |
| gre0 | G component |
| blu0 | B component |
| alph | Alpha component |
| dpth | depth component |
| disp | disparity component |
| yvu0 | Same yvu0 but U and V swapped |
| rbg0 | same rgb0 but B and G swapped |
| vyu0 | Same vyu0 but Y and V swapped |
| brg0 | same rbg0 but B and R swapped |
| . | |
| . | |
| . | |
| ayuv | Alpha + YUV format |

The component_sampling_type syntax element represents the characteristics related to the sampling of the components with reference to the sampling of one component. Typically, the component of reference is the Y component for YUV samples or it is the B component for RGB samples. For other component types (and when the number of components is greater than 1) the reference component is for example the first component of the sample. For instance, the following table lists the type of component subsampling (for YUV it is chroma subsampling) that is associated with a given value of component_sampling_type.

| component_sampling_type | Component sampling |
| --- | --- |
| 0 | 4:4:4 |
| 1 | 4:2:2 |
| 2 | 4:2:0 |
| 3 | 4:1:1 |
| 4-7 | reserved |

The packing_type syntax element represents the characteristics related to the packing format of the component value. This syntax element associates a value with a predetermined packing format. For instance, the following table indicates the type of the packing format used for the components described by the uncompressed_video_format syntax element. The packing_type equal to 0 indicates that no packing is employed which corresponds to planar packing type. The value 1 indicates that the components are packed for example as in the FIG. 1b. The value 2 indicates that the components are packed with padding such that the component values are align on byte boundaries. For example, if the length of the component values is 10 bits, the padding size for each value is 6 bits.

The value 3 corresponds to specific packing patterns that interleave bits of parts of two or more values within the same byte. For example (as illustrated in the FIG. 7), some monochrome uncompressed formats, with a component value lengths of 10 bits represent two pixels (i.e. one component value for each pixel) on 24 bits. The first byte contains 8 bits of the component value for the first pixel. The third byte contains the 8 bits of the second pixel. The first and second bits of the second byte contain the remaining bits of the first pixel value while the fifth and sixth bits of the second byte contain the remaining bits of the second pixel value. The other bits of the second byte are not used (i.e. they may be set equal to 0). The value 4 of packing_type correspond to format wherein the values of the first component are in planar representation while the other components are packed. Typically, for a YUV format, the Y component is in planar representation while the U and V components are packed. Other packing formats may be represented by other values of packing_type that are not represented in the table.

| packing_type | Packing description |
| --- | --- |
| 0 | No packing |
| 1 | component (pixel or value) packing no padding |
| 2 | component (pixel or value) packing byte aligned |
| 3 | component (pixel or value) packing with byte interleaving |
| 4 | 1st component planar other packed |
| 5-255 | reserved | big_endian equal to 0 indicates that the component values are stored using little-endian order. When equal to 1, it states that the values are stored using big-endian order. When the component_value_length is lower than eight, the value of this flag should be ignored.

In another variant of this embodiment, the syntax element (typically, uncompressed_video_format) that represents the characteristics of the component types is constrained to represent only the types of the components and not the order of the components. Other syntax elements are added to the generic information describing samples of an uncompressed video sequence to specifically signal the order of the components in the uncompressed video format. This variant reduces the number of values of uncompressed_video_format that are necessary to represent a given set of uncompressed video formats. For example, the UncompressedVideoConfiguration may comprise an additional component_permutation_index syntax element that permits to determine the order of the components described by uncompressed_video_format.

```
class UncompressedVideoConfiguration extends Box('uncC') {
    unsigned int(32) uncompressed_video_format;
    unsigned int(8) component_value_length;
    unsigned int(2) component_count;
    unsigned int(3) chroma_sampling_type;
    unsigned int(1) big_endian
    unsigned int(2) reserved;
    unsigned int(8) component_permutation_index ;
    unsigned int(8) packing_type;
}
```

In that case, the table below list the various component types that may be represented by uncompressed_video_format.

| uncompressed_video_format | description |
|---|---|
| mono | Monochrome format |
| yuv0 | YUV format |
| rgb0 | RGB format |
| yuva | YUV plus alpha format |
| yuvd | YUV format plus depth format |
| yuvD | YUV format plus Disparity format |
| Ditto for rgba, rgbd, rgbD | |
| luma | Y component |
| crb0 | U component |
| crr0 | V component |

The number of values is reduced in comparison to previous example. The component index of the i-th component described by the uncompressed_video_format is defined for each type of components as in the following table:

| uncompressed_video_format | Component index | | | |
|---|---|---|---|---|
| | 1 | 2 | 3 | 4 |
| mono | M | NA | NA | NA |
| yuv0 | Y | U | V | NA |
| rgb0 | R | G | B | NA |
| yuva | Y | U | V | Alpha |
| yuvd | Y | U | V | Depth |
| yuvD | Y | U | V | Disparity |
| rgba | R | G | B | Alpha |
| rgbd | R | G | B | Depth |
| rgbD | R | G | B | Disparity |

The component_permutation_index allows determining the order of the components in the uncompressed format. By default (i.e. when component_permutation_index equal to 0) the order of the components is the same as the component index. However, when the value is greater than 0, it specifies the permutation index of the components. The permutation index corresponds to an index in a table that associates a different order for each component with a particular component index. This table contains all the possible permutations of components associated with an index for each permutation. For example, the table may be the following:

| component_permutation_index | comp_order[0] | comp_order[1] | comp_order[2] | comp_order[3] |
|---|---|---|---|---|
| 0 | 0 | 1 | 2 | 3 |
| 1 | 0 | 1 | 3 | 2 |
| 2 | 0 | 2 | 1 | 3 |
| 3 | 0 | 2 | 3 | 1 |
| 4 | 0 | 3 | 1 | 2 |
| 5 | 0 | 3 | 2 | 1 |
| 6 | 1 | 0 | 2 | 3 |
| 7 | 1 | 0 | 3 | 2 |
| 8 | 1 | 2 | 0 | 3 |
| 9 | 1 | 2 | 3 | 0 |
| 10 | 1 | 3 | 0 | 2 |
| 11 | 1 | 3 | 2 | 0 |
| 12 | 2 | 0 | 1 | 3 |
| 13 | 2 | 0 | 3 | 1 |
| 14 | 2 | 1 | 0 | 3 |
| 15 | 2 | 1 | 3 | 0 |
| 16 | 2 | 3 | 0 | 1 |
| 17 | 2 | 3 | 1 | 0 |
| 18 | 3 | 0 | 1 | 2 |
| 19 | 3 | 0 | 2 | 1 |
| 20 | 3 | 1 | 0 | 2 |
| 21 | 3 | 1 | 2 | 0 |
| 22 | 3 | 2 | 0 | 1 |
| 23 | 3 | 2 | 1 | 0 |

-continued

| uncompressed_video_format | description |
|---|---|
| red0 | R component |
| gre0 | G component |
| blu0 | B component |

The coding or reconstruction order of the i-th component described by the uncompressed_video_format is equal to the value of comp_order[i] accordingly to the table.

In yet another variant, the syntax element (typically, uncompressed_video_format) that represents the characteristics of the component types is constrained to represent the type of a subset of components present in the format and not the order of the components. The zero or more components that are not described in this syntax element are represented as additional components that have their own syntax element. For instance, the syntax of the UncompressedVideoConfiguration is the following:

```
class UncompressedVideoConfiguration extends Box('uncC') {
    unsigned int(32) uncompressed_video_format;
    unsigned int(8) component_value_length;
    unsigned int(2) main_component_count;
    unsigned int(3) component_sampling_type;
    unsigned int(1) big_endian;
    unsigned int(2) additional_component_count;
    for (i = 1 ; i <= additional_component_count; i++) {
        unsigned int(32) additional_component_type [ i ];
        unsigned int(8)
     additional_component_value_length[ i ];
    }
    unsigned int(8) component_permutation_index;
    unsigned int(8) packing_type;
}
```

The semantics of the uncompressed_video_format syntax element now specify the format of the components in the samples as follows:

| uncompressed_video_format | description |
|---|---|
| mono | Monochrome format |
| yuv0 | YUV format |
| rgb0 | RGB format |
| luma | Y component |
| crb0 | U component |
| crr0 | V component |
| red0 | R component |
| gre0 | G component |
| blu0 | B component |
| alph | Alpha component |
| dept | depth component |
| disp | disparity component |
| mask | Mask component |
| ther | Thermal component |

The number of possible values for this syntax elements is further reduced. The component_value_length indicates the length in bits of the component values.

main_component_count indicates the number of main components in each sample of the video data.

The additional_component_count and additional_component_type[i] and component_value_length[i] represent the characteristics of the additional components when present. additional_component_count indicates the number of additional components (the value of this syntax element is greater or equal to 0) and additional_component_type[i] specifies the type of the i-th additional component. For instance, the following table lists the type of possible additional components:

| additional_component_type[ i ] | description |
|---|---|
| alph | alpha component |
| dept | depth component |
| disp | disparity component |
| mono | Monochrome component |
| luma | Y component |
| crb0 | U component |
| crr0 | V component |
| red0 | R component |
| gre0 | G component |
| blu0 | B component |
| mask | Mask component |
| ther | Thermal component | additional_component_value_length[i] indicates the length in bits of the values of the i-th additional component.

component_permutation_index still indicates the permutation index of the components. The component index of the i-th component described by the uncompressed_video_format is described in the following table:

| uncompressed_video_format | Component index | | |
|---|---|---|---|
| | 0 | 1 | 2 |
| mono | M | NA | NA |
| yuv0 | Y | U | V |
| rgb0 | R | G | B |

The index of the i-th additional component is equal to i plus main_component_count. Semantics of the other syntax elements remain unchanged.

In another variant, the permutation index that specifies the order of the components is replaced by a list of size equal to the number of components present in the format (including the additional components if any). The i-th item of the list indicates the coding or reconstruction index of the i-th component described in the generic information describing samples of an uncompressed video sequence.

In another variant, a syntax element (e.g. additional_component_sampling_type[i]) may be associated to each additional component when the additional component is subsampled with reference to the reference component. This additional_component_sampling_type applies to the i-th additional component and may have the same semantics as component_sampling_type in previous variants.

In another variant, the syntax element that describes the characteristics of the component types present in the sequence may indicate a component for padding. Typically, some formats may pack the components with padding data that have the same length of the component values. A specific value of uncompressed_video_format may be specified for this purpose for example with 'padd' 4CC.

In yet another variant, the uncompressed_video_format is not signalled in the UncompressedVideoConfigurationBox but its value is inferred equal to the value of the UncompressedVideoSampleEntry's 4CC type. This allows a parser to determine the type of the components directly from the 4CC of the sample entry without having to parse the UncompressedVideoConfigurationBox.

In another variant the uncompressed_video_format is replaced by one or more syntax elements that specify the list of the component types in the uncompressed format. The order of components in the list matches the coding order of the components. For instance, the sample entry that signal the generic information describing samples of an uncompressed video sequence may have the following syntax:

```
class UncompressedVideoConfigurationBox extends Box('uncC') {
    UncompressedVideoConfigurationRecord config;
}
class UncompressedVideoSampleEntry(type) extends
VisualSampleEntry(type) {
    UncompressedVideoConfigurationBox config;
}
class UncompressedVideoConfigurationRecord {
    unsigned int(8) component_count;
    for (i = 1 ; i <= component_count ; i++) {
        unsigned int(8) component_format[i]
    }
    unsigned int(8) component_value_length;
    unsigned int(8) packing_type;
    unsigned int(3) component_sampling_type;
    unsigned int(1) big_endian;
    bit(4) reserved = 0;
}
```

The exact 'type' identifier as used in a Sample Entry of the Sample Description must be defined. By default, the 'uncV' type indicates that the associated track contains an uncompressed video format that is further described by an UncompressedVideoConfigurationRecord. Other values for the type identifier may be registered to represent predetermined types of uncompressed video format. These new values allow identifying a predetermined set of values for the parameters of UncompressedVideoConfigurationRecord. For example, it is possible to register a 'y420' 4CC to represent a YUV 4:2:0 on 8 bits. A parser that supports this 4CC could skip the parsing of the UncompressedVideoConfigurationRecord by inferring its content from the knowledge of 4CC semantics. A parser not supporting the 4CC can however inspect the UncompressedVideoConfigurationRecord to check if some component(s) may be supported.

The semantics of the syntax elements is the following in this example:

component_count indicates the number of components in each sample of the video data.

component-format[i] specifies the type of the i-th component used for the uncompressed video sequence. The purpose of this field is to describe the content of one of the components comprised in the format.

The values in the range 10 to 128 are reserved for future ISO definition and the values in the range 128 to 254 are available for proprietary component types.

| Value | ASCII Value | Description |
|---|---|---|
| 0 | 'M' | Monochrome/Grey level component |
| 1 | 'Y' | (Y) Luma component |
| 2 | 'U' | (U) Chroma component |
| 3 | 'V' | (V) Chroma component |
| 4 | 'R' | (R) Red component |
| 5 | 'G' | (G) Green component |
| 6 | 'B' | (B) Blue component |
| 7 | 'A' | (A) Alpha/transparency component |
| 8 | 'D' | Depth component |
| 9 | 'd' | Disparity component |
| 10-128 | NA | Reserved for future definition |
| 128-254 | NA | Unrestricted values for user definition |
| 255 | 'X' | Padded bytes (Unused bytes) | component_value_length indicates the length in bits of the component values.

packing_type indicates the type of packing format used for the components.

| packing_type | Packing description |
|---|---|
| 0 | No packing |
| 1 | component (pixel or value) packing no padding |
| 2 | component (pixel or value) packing byte aligned |
| 3 | component (pixel or value) packing with byte interleaving |
| 4 | 1st component planar other packed |
| 5 | No packing value byte aligned |
| 5-255 | reserved | component_sampling_type indicates the sampling type of the components if any. Otherwise, it shall be equal to 0.

| Component_sampling_type | sampling |
|---|---|
| 0 | 4:4:4 |
| 1 | 4:2:2 |
| 2 | 4:2:0 |
| 3 | 4:1:1 |
| 4-7 | reserved | big_endian equal to 0 indicates that the component values are stored using little-endian order. When equal to 1, it states that the values are stored using big-endian order. When the component_value_length is lower than eight, the value of this flag should be set to 0.

In another embodiment, the uncompressed video sequence or part of the uncompressed video sequence corresponds to the output of a sensor using a Bayer filter, or more generally to a video sequence filtered by a Bayer filter. The generic information describing samples of such an uncompressed video sequence contains syntax elements that indicate that the samples correspond to the output of a Bayer filter.

As a reminder, a Bayer filter is typically used to capture a color image using a non-color sensitive sensor. Each component of the Bayer filter filters a different color, typically red, green and blue. As a result each pixel of the sensor capture the luminance value at that location and the color information corresponding to the color component of the Bayer filter located in front of this pixel. The relative localisation of the different color component values for a given pixel depends on the particular Bayer filter used to produce the filtered component. Typically in a Bayer filter, each square of four pixels has one red component, one blue component and two green components. Knowledge of the particular Bayer filter used is generally required to exploit the filtered component.

For example, the sample description for a track encapsulating such an uncompressed video sequence may contain indication that the samples of this track correspond to the output of a Bayer filter. As another example, the sample description for a track encapsulating such an uncompressed video sequence may contain indication that part of the samples of this track correspond to the output of a Bayer filter. For such an uncompressed video sequence, the sample entry type may be set to 'uncv' and the sample description may contain a structure describing the components, such as the UncompressedVideoConfiguration ('uncC') described in other embodiments. The uncompressed_video_format, the additional_component_type or the component_format syntax elements may be used to indicate that one or more components of the uncompressed video sequence represent the output of a Bayer filter. For example, to indicate that a component is the output of a Bayer filter, the uncompressed_video_format value 'baye' may be used. As another example, to indicate that an additional component is the output of a Bayer filter, the additional_component_type value 'baye' may be used. As yet another example, to indicate that a component is the output of a Bayer filter, the component_format value 'b' may be used.

In a variant, the uncompressed_video_format, the additional_component_type or the component_format syntax elements used for describing a component that is the output of a Bayer filter may have a value indicating that this component is a simple component (for example a monochrome component, a grey component, or a luma or Y component). In this variant, another syntax element may be used to indicate that the component correspond to the output of a Bayer filter.

In a variant, the sample entry that signals the generic information describing the samples of an uncompressed video sequence may contain a syntax element indicating whether the uncompressed video sequence corresponds to the output of a Bayer filter. This syntax element may have the following syntax:

```
class UncompressedVideoConfiguration extends Box('uncC') {
    ...
    unsigned int(1) bayer_filter_presence;
    ...
}
```

When the value of the bayer_filter_presence syntax element is true or 1, this means that the component identified as a Bayer filter output, using for example the 'baye' value for the uncompressed_video_format syntax element, or as a luma component corresponds to the output of a Bayer filter.

Possibly this variant may be combined with the previous variant.

The structure of the Bayer filter may be further described by a matrix as described hereinbefore. It may also be described as a matrix listing the components of the Bayer filter, using for example the following syntax:

```
class UncompressedVideoConfiguration extends Box('uncC') {
    ...
    unsigned int(4) matrix_columns;
    unsigned int(4) matrix_rows;
    for (int i=0; i < matrix_rows; i++) {
        for (int j=0; j < matrix_columns; j++) {
            unsigned int(4) bayer_component[i][j];
        }
    }
    ...
}
```

In this structure, the value of the syntax element bayer_component[i][j] indicates the type of the Bayer filter for the component at the i-th row and the j-th column of the Bayer filter matrix.

For example, the following table lists some values for the bayer_component syntax element.

| Value | Description |
|---|---|
| 0 | Red |
| 1 | Green |
| 2 | Blue |
| 3 | White |
| 4 | Grey |
| 5-15 | Reserved for future definition |

In another variant, an additional syntax element may be added to the description of the Bayer filter to specify the number of repetitions of each component, both horizontally and vertically. This syntax element may be named cell_width. For example, to represent a Quad Bayer filter, where the components are RRGGRRGG. RRGGRRGG. GGBBGGBB, GGBBGGBB, RRGGRRGG. RRGGRRGG, GGBBGGBB, GGBBGGBB, a cell_width of 2 is used. Possibly, two syntax elements may be used to specify independently the number of horizontal and of vertical repetitions.

Possibly, the structure of the Bayer filter may be described using a list of predefined Bayer filter structures, using for example the following syntax:

```
class UncompressedVideoConfiguration extends Box('uncC') {
    ...
    unsigned int(8) bayer_filter_type;
    ...
}
```

The following table lists some possible values for the bayer_filter_type syntax element.

| Value | Description |
|---|---|
| 0 | 2 × 2, BGGR |
| 1 | 2 × 2, RGBG |
| 2 | 2 × 2, GRBG |
| 3 | 2 × 2, RGGB |
| 4 | 4 × 4, WBWG BWGW WGWR GWRW |
| 5 | 4 × 4, GWRW GWRW BWGW BWGW |
| 6 | 4 × 4, GWRW BWGW GWRW BWGW |
| 7 | 4 × 4, WRWR BGBG WRWR BGBG |
| 8 | 3 × 3, GBG RGR BGB |
| 9 | 3 × 3, GRG BGB GRG |
| 10 | Quad |
| 11-255 | Reserved for future definition |

In a variant, a predetermined value of the bayer_filter_type syntax element, for example the value 0, may be reserved to indicate that none of components of the uncompressed video sequence is the output of a Bayer filter.

In a variant, the structure of the Bayer filter represented by a predetermined value of the bayer_filter_type syntax element, for example the value 255, may be further described by a complete matrix. For example, the generic information describing samples of an uncompressed video sequence may contain the following syntax elements:

```
class UncompressedVideoConfiguration extends Box('uncC') {
    ...
    unsigned int(8) bayer_filter_type;
    if (bayer_filter_type == 255) {
        unsigned int(4) matrix_columns;
        unsigned int(4) matrix_rows;
        for (int i=0; i < matrix_rows; i++) {
            for (int j=0; j < matrix_columns; j++) {
                unsigned int(4) bayer_component[i][j];
            }
        }
    }
    ...
}
```

For this set of syntax elements, the value 255 for the bayer_filter_type syntax element corresponds to an explicit definition of the structure of the Bayer filter.

In a variant, several components of an uncompressed video sequence may correspond to the output of a Bayer filter. The generic information describing samples of an uncompressed video sequence may contain syntax elements that describe the structure of the Bayer filter for each component, for example using a loop over the components of the uncompressed video sequence.

In another variant, the presence of the syntax element defining the structure of the Bayer filter may be conditional to the value of the bayer_filter_presence syntax element. If the value of the bayer_filter_presence syntax element is false or 0, then the syntax elements defining the structure of the Bayer filter are not present, otherwise they are present.

In another variant, the structure of the Bayer filter may be described by the packing_type syntax element. Specific values corresponding to different structures of the Bayer filter, such as those listed in the table above, may be added to the list of values describing the packing of the components of the uncompressed video sequence. The semantics of the packing_type syntax element's value may depend on the value of the bayer_filter_presence syntax element. If the value of the bayer_filter_presence syntax element is false or 0, then the packing_type value describes the packing of the components, otherwise this value describes the structure of the Bayer filter.

In yet another variant, the structure of the Bayer filter may be described by the component_sampling_type syntax element, similarly to how it may be described by the packing_type syntax element as indicated in the previous variant.

An uncompressed video sequence may contain a component that is the output of a Bayer filter as well as other components. Possibly different values for the uncompressed_video_format syntax element may be defined to describe different combinations of the output of a Bayer filter with other components. For instance, the following values may be used:

| uncompressed_video_format | Description |
|---|---|
| bay0 | Bayer filter output format |
| baya | Bayer filter output plus alpha format |
| bayd | Bayer filter output format plus depth format |
| bayD | Bayer filter output format plus Disparity format |

The description of the output of a Bayer filter as detailed in this variant may be combined with other embodiment of the invention.

In a variant, the uncompressed video sequence may correspond to the output of a filter different from the Bayer filters. The generic information describing samples of such an uncompressed video sequence may contain syntax elements for describing filters different from a Bayer filter. For example these syntax elements may describe filters such as cyan, magenta and yellow filters, cyan, yellow, green and magenta filters, red, green, blue and emerald filters or red, green, blue and white filters.

In a variant, the output of a Bayer filter may be split into several components depending on the type of filter applied. For instance, a first component may contain all the values corresponding to a red filter, a second component may contain all the values corresponding to a blue filter and a third component may contain all the values corresponding to a green filter.

As an example, the sample entry that signals the generic information describing samples of an uncompressed video sequence that may contain a component that is the output of a Bayer filter may have the following syntax.

```
class UncompressedVideoConfigurationBox extends Box('uncC') {
    UncompressedVideoConfigurationRecord config;
}
class UncompressedVideoSampleEntry(type) extends
VisualSampleEntry(type) {
    UncompressedVideoConfigurationBox config;
}
class UncompressedVideoConfigurationRecord {
    unsigned int(8) component_count;
    for (i = 1 ; i <= component_count ; i++) {
        unsigned int(8) component_format[i];
    }
    unsigned int(8) component_value_length;
    unsigned int(8) packing_type;
    unsigned int(8) bayer_filter_type;
    unsigned int(3) component_sampling_type;
    unsigned int(1) big_endian;
    bit(4) reserved = 0;
}
```

In this example, the value 'b' may be used for the component_format syntax element to indicate that a component corresponds to the output of a Bayer filter. The bayer_filter_type syntax element may be used to define the structure of the Bayer filter, with the value 0 indicating that no component corresponds to the output of a Bayer filter.

As another example, the sample entry that signals the generic information describing samples of an uncompressed video sequence that may contain a component that is the output of a Bayer filter may have the following syntax.

```
class UncompressedVideoConfigurationBox extends Box('uncC') {
    UncompressedVideoConfigurationRecord config;
}
class UncompressedVideoSampleEntry(type) extends
VisualSampleEntry(type) {
    UncompressedVideoConfigurationBox config;
}
class UncompressedVideoConfigurationRecord {
    unsigned int(8) component_count;
    for (i = 1 ; i <= component_count; i++) {
        unsigned int(8) component_format[i];
    }
    unsigned int(8) component_value_length;
    unsigned int(8) packing_type;
    unsigned int(3) component_sampling_type;
    unsigned int(1) big_endian;
    unsigned int(1) bayer_filter_presence;
    bit(3) reserved = 0;
    if (bayer_filter_presence == 1) {
        unsigned int(4) matrix_columns;
        unsigned int(4) matrix_rows;
        for (int i=0; i < matrix_rows; i++) {
            for (int j=0; j < matrix_columns; j++) {
                unsigned int(4) bayer_component[i][j];
            }
        }
    }
}
```

In this example, the value 'b' may be used for the component_format syntax element to indicate that a component corresponds to the output of a Bayer filter. If a component corresponds to the output of a Bayer filter, then the value of the bayer_filter_presence syntax element is set to 1. The matrix_columns, matrix_rows and bayer_component syntax elements may be used to define the structure of the Bayer filter.

In another embodiment, the uncompressed video sequence may be encapsulated into several tracks. This multi-track approach consists in encapsulating a set of components in separate tracks identified by their track ID. Typically, one (or more) component per track. We refer to this kind of tracks as Component Tracks.

Figure 8:
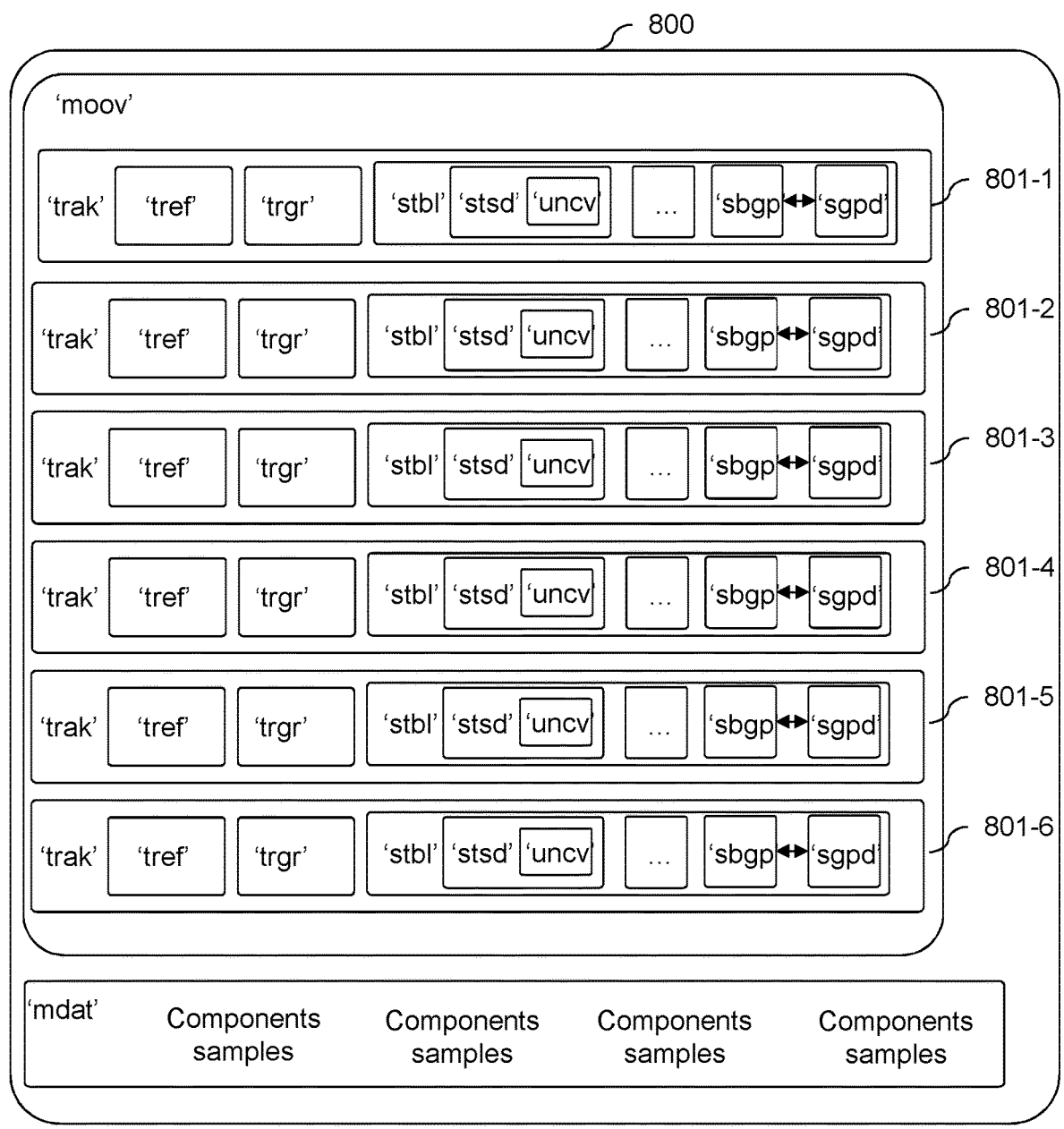
FIG. 8 illustrates another example of format for uncompressed video sequence.

For example, the FIG. 8 illustrates an example of format for an uncompressed video sequence 800 for which the components are encapsulated in several tracks 801-1 to 801-4.

In a first variant of this embodiment, one or more base tracks may reference these component tracks to form the output format.

For example, the FIG. 8 illustrates three Component Tracks 801-1, 801-2 and 801-3, one for each component of a YUV video sequence associated with a disparity component represented by the Component Track 801-4. The Component Tracks 801-1 to 801-4 include the generic information describing samples of an uncompressed video sequence that indicates the type of the component in the track. Typically, the sample entry of the Component Track 801-1 indicates that the component present in the track is a luma component (e.g. a component_format[i] equal to 'Y' or an uncompressed_video_format equal to 'luma', or the fourcc of the sample entry is equal to 'luma'). Similarly, the sample entries of the Component Tracks 801-2, 801-3 and 801-4 indicate the type of each component described in the track.

A first base track 801-5 uses a 'comp' track reference to reference the Y, U and V component tracks. The samples of the base track form a first output format from the samples of the Component Tracks. A second base track (801-6) may also reference the same component tracks or a subset or a superset to form a second output format. For instance, the second track references the three YUV component tracks and the disparity component track.

The uncompressed video sample entry of the base track indicates the format of the output. By default, the reconstruction process of a sample of the base track consists in concatenating the samples of each component track. The concatenation order is by default the order of 'comp' track references. As a result, the default reconstruction process of base track that references component track produces a planar representation.

To generate packed content (typically the packing_type of the base track is greater than 0), a parser may apply an additional pixel reconstruction process as a post filter to form the packed content from the planar reconstructed samples of a base track. The post filter operation generates the packed samples from the planar reconstructed samples as it is described for each value of the packing_type field. Therefore, it is possible to define profiles that may or may not support specific values of packing_type.

This multi-track approach thus allows representing the same format as in the single-track approach but enables to provide alternative operating points without having to duplicate information. For example, a YUV video sequence with a depth component may be encapsulated in a file with two base tracks. The first base track may generate an output format containing only the YUV components while the second track may generate an output format with all the four components. A parser may also retrieve the samples corresponding to a single component by selecting and decoding the corresponding component track.

In addition, the multi-track approach is more flexible than the single-track approach and thus allows representing more formats. For instance, in the single-track approach of some embodiments, all the colour components may have to share the same length in bits for the component values. With a multitrack approach, it is possible to define different value lengths for each component track. In that case, the length of the component values indicated in sample entry of the base track may be set equal to 0 to indicate that the lengths of the component tracks are different. In a variant, the length of the components indicated in sample entry of the base track may be set equal to the maximum length of the referenced component tracks. When each track contains one component, it is possible to extract a portion of each of the component and then to generate an output corresponding to a region from all the portions of the components. The extraction can be done easily, independently of the component sampling and output format. In another embodiment, an optional uncompressed track reference order sample group may indicate the concatenation order for the component tracks. This sample group is used in component base tracks with 'comp' track referencing to one or more component tracks. For example, the syntax of UncompressedComponentOrderEntry is the following.

```
aligned(8) class UncompressedComponentOrderEntry ( ) extends
VisualSampleGroupEntry('ucor')
{
   unsigned int(16) num_component_ref_idx;
   for (i = 0; i < num_component_ref_idx; i++)
      unsigned int(16) comp_track_ref_idx[i];
}
```

The semantics of UncompressedComponentOrderEntry of the syntax elements is the following:

num_component_ref_idx greater than 0 specifies the number of reference indices of component tracks referenced by the component base track. num_component_ref_idx equal to 0 specifies that 1) the number of reference indices of component tracks or track groups of Component tracks referenced by the base track is equal to the number of entries in the 'comp' track reference of the component base track, and 2) the order of component tracks to be resolved for inclusion into the uncompressed video bitstream reconstructed from the component track is the same as the order of the entries in the 'comp' track reference of the base track.

comp_track_ref_idx[i] specifies a 'comp' track reference index of the i-th list of one or more components to be included in the uncompressed video bitstream reconstructed from the component base track.

In yet another embodiment, the uncompressed format generated from multiple Component Tracks is described using Track Group mechanism. For this purpose, a new UncompressedVideoGroupBox TrackGroup with the 'uncV' 4CC contains the generic information describing samples of an uncompressed video sequence generated from the one or more Component Tracks that belong to same uncompressed video track group (i.e. with the same pair of track_group_id and track_group_type equal to 'uncV'). As a result, the parser is able to determine a group of Components Tracks that form an uncompressed video of one or more components comprised in the Components Tracks. The parser is in charge of determining an output format suitable for the group of the Component Tracks. By default, it may form a planar representation of the components present in the tracks of the group. The order of the components may follow the order of the tracks in the track group or may be signalled in the UncompressedVideoGroupBox. In another variant the track group may indicate the output format that should be generated by the parser. For example, the syntax of the Uncompressed Video Track Group is the following:

```
aligned(8) class UncompressedVideoGroupDescriptionBox extends
FullBox('unvg', 0, 0) {
    unsigned int(8) component_count;
    for (i = 1 ; i <= component_count ; i++) {
        unsigned int(8) component_format[ i ]
    }
    unsigned int(8) component_value_length;
    unsigned int(8) packing_type;
    unsigned int(3) component_sampling_type;
    unsigned int(1) big_endian;
    bit(4) reserved = 0;
}
aligned(8) class UncompressedVideoGroupBox extends
TrackGroupTypeBox('uncV') {
    // track_group_id is inherited from TrackGroupTypeBox;
    unsigned int(32) uncompressed_format; // mandatory
    UncompressedVideoGroupDescriptionBox description; // optional
}
```

The semantics of the syntax elements is similar to the ones of the sample entry. The uncompressed_format specifies the 4CC of the uncompressed video format represented by the group of tracks. When equal to 'uncV' it indicates a generic compressed format that is described in the description Box. The description syntax element specifies an optional UncompressedVideoGroupDescriptionBox describing the uncompressed video format of the output format generated from the Component Tracks of the Uncompressed Video Track group. Semantics of the syntax elements of the UncompressedVideoGroupDescriptionBox is the same as the UncompressedVideoConfigurationRecord box (of the sample entry). In particular, the order of the components in the Uncompressed format described by the Uncompressed Video Track group is indicated by UncompressedVideoGroupDescriptionBox using similar principle as for the sample entry. In the exemplary syntax of UncompressedVideoGroupDescriptionBox, the components present in all the Component Tracks of the Track Group are listed in the coding or reconstruction order.

In another embodiment, the presence of UncompressedVideoGroupDescriptionBox in UncompressedVideoGroupBox is optional. In particular it may happen when the content of the UncompressedVideoGroupDescriptionBox is inferred from the 4CC coded in uncompressed_format field of the UncompressedVideoGroupBox. Typically, it may happen when a specific UncompressedVideoGroupDescriptionBox instance (i.e. with predetermined values for each of its fields) is registered and associated with a predetermined 4CC for the uncompressed_format field. In such a case, the UncompressedVideoGroupDescriptionBox may comprise another Box that describes for each component of the Component Track, a coding or reconstruction index for this Component in the uncompressed video format resulting from the track group. For example, the new syntax of the Uncompressed Track Group is the following:

```
aligned(8) class UncompressedVideoGroupComponentOrderDescription
extends FullBox('uvgo',0,0) {
    unsigned int(8) component_count_in_track;
    for (i = 1 ; i <= component_count_in_track; i++) {
        unsigned int(8) component_order_idx[ i ]
    }
}
aligned(8) class UncompressedVideoGroupDescriptionBox extends
FullBox('unvg',0,0) {
    unsigned int(8) component_count;
    for (i = 1 ; i <= component_count; i++) {
        unsigned int(8) component_format[ i ]
    }
```

-continued
```
    unsigned int(8) component_value_length;
    unsigned int(8) packing_type;
    unsigned int(3) component_sampling_type;
    unsigned int(1) big_endian;
    bit(4) reserved = 0;
}
aligned(8) class UncompressedVideoGroupBox extends
TrackGroupTypeBox('uncV') {
    // track_group_id is inherited from TrackGroupTypeBox;
    unsigned int(32) uncompressed_format; // mandatory
    UncompressedVideoGroupDescriptionBox description; // optional
    UncompressedVideoGroupComponentOrderDescription order_desc;
//optional
}
```

The semantics of the UncompressedVideoGroupComponentOrderDescription is the following (others remain unchanged): order_desc specifies an optional UncompressedVideoGroupComponentOrderDescription describing the reconstruction (or coding order) of the components of the Component Track within the output format formed from the uncompressed video track group.

component_order_idx[i] is the reconstruction index of the i-th component described in the sample entry of the Component Track. The reconstruction index indicates the order of a component in the output format formed from Component Tracks of the Uncompressed video track group.

In another embodiment, each component of an uncompressed image format may be represented using one or more Items (data which does not require timed processing, as opposed to sample data). For example, one component per Item. In such a case, the uncompressed format may be represented as one or more Component Items that are part of the same Uncompressed format entity to group. A new UncompressedVideoGroupBox may extend the EntityToGroupBox with 'uncV' 4CC. It contains the generic information describing samples of an uncompressed video sequence or image generated from one or more Component Tracks or Component Items that belong to same uncompressed video entity group. The syntax and semantics of the EntityToGroupBox is similar to the uncompressed video track group and is for example the following:

```
aligned(8) class UncompressedVideoGroupDescriptionBox extends
FullBox('unvg',0,0) {
    unsigned int(8) component_count;
    for (i = 1 ; i <= component_count; i++) {
        unsigned int(8) component_format[ i ]
    }
    unsigned int(8) component_value_length;
    unsigned int(8) packing_type;
    unsigned int(3) component_sampling_type;
    unsigned int(1) big_endian;
    bit(4) reserved = 0;
}
aligned(8) class UncompressedVideoGroupBox extends
EntityToGroupBox('uncV', 0, 0) {
    unsigned int(32) uncompressed_format; // mandatory
    UncompressedVideoGroupDescriptionBox description; // optional
}
```

The semantics of the syntax elements is similar to the ones in the uncompressed video track group but now apply to the Component Items or Tracks of the entity to group.

In a variant, the reconstruction order of the components of the uncompressed format represented by the entity to group follows the declaration order of the items or tracks described in the EntityToGroupBox.

The generic information describing samples of an uncompressed video sequence may be used with 'vide' or with 'pict' tracks. For example, a sample entry containing the description of components of an uncompressed video sequence, e.g. an UncompressedVideoConfigurationRecord, may be associated with a 'vide' or a 'pict' track. The generic information describing samples of an uncompressed video sequence may be used with multiple tracks.

The sequence of pictures 225 in FIG. 2 may correspond to one or more still image that may be encapsulated into image item(s) by the encapsulation module 205. An image item is defined by the ISOBMFF specification as data that does not require timed processing, as opposed to sample data, and is described by the boxes contained in a MetaBox ('meta' box). For example, the sequence of pictures may consist in spatial images from a telescope, or to pictures taken by a camera.

Figure 9A:
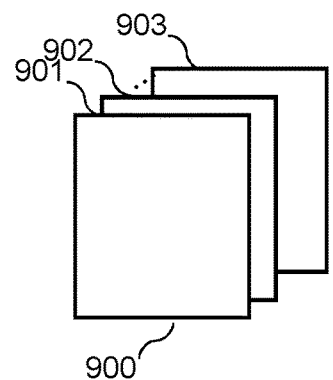

In the example of FIG. 9a, an image 900 contains a series of components 901, 902 and 903.

Figure 9B:
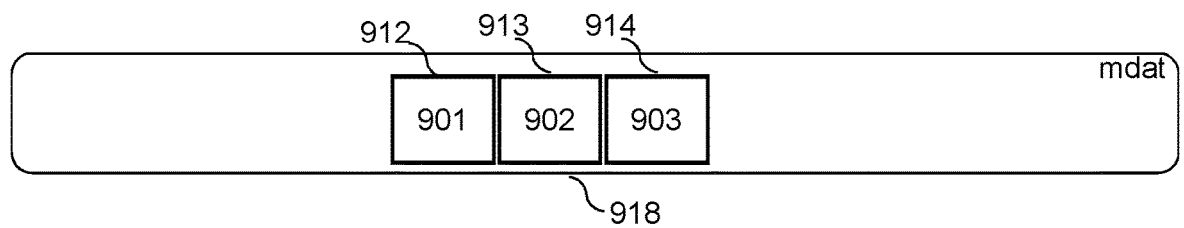

Different bitstream representations of the values contained in each component of an image 900 may be used. For example, in FIG. 9b, the bitstream 918 consists in a planar representation of the components of the image 900 of FIG. 9a whose data are stored in the media data part of the media file (e.g. the 'mdat' box). The media file may be an HEIF file or deriving from the HEIF specification like for example a MIAF file. The metadata part of the file (e.g. the 'meta' box, not represented) indicates the location of the byte ranges of the image components. For example, the first byte range 912 of the bitstream 918 contains the values of the first component 901 of the image. The second byte range 913 contains the values of the second component 902 of the image. And the last byte range 914 contains the values of the third component 903 of the image.

Figure 9C:
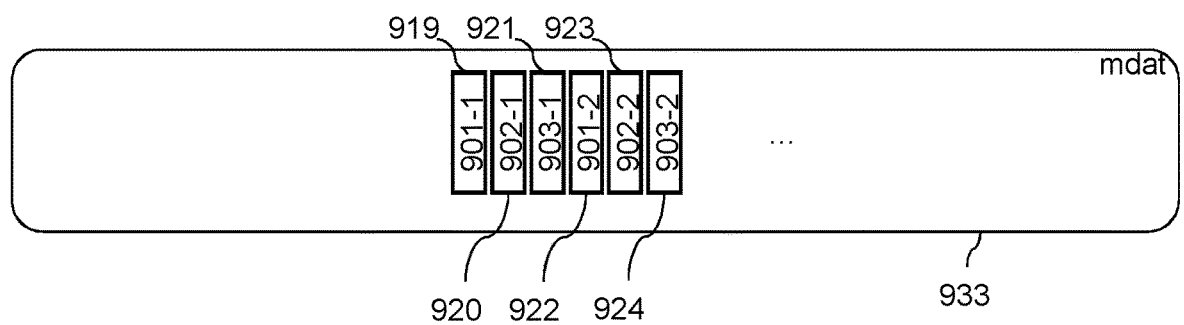

As another example, in FIG. 9c, the bitstream 933 consists in a packed representation of the components of the image 900 of FIG. 9a whose data are stored in the media data part of the media file (e.g. the 'mdat' box). The first byte series 919 of the bitstream 933 contains the first value of the component 901. The second byte series 920 contains the first value of the component 902 and the third byte series 921 contains the first value of the component 903. The following byte series, 922, 923 and 924 contain respectively the second value of the components 901, 902 and 903. This pattern is repeated for the remaining values of the three components. The metadata part of the media file ('e.g.' the 'meta' box not represented) may provide the location of a byte range corresponding to the packed components.

Figure 10:
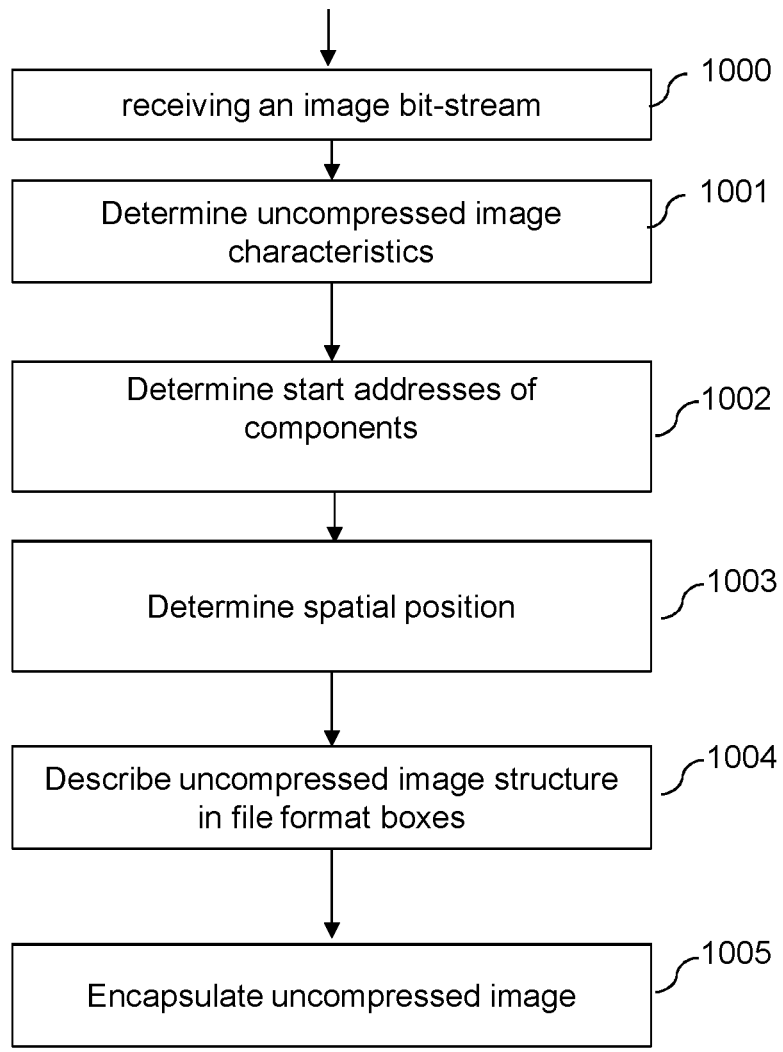

FIG. 10 illustrates an example of a process for encapsulating images in a media file according to embodiments of the invention. In a first step 1000, the media file writer, for example the encapsulation module 205, receives the sequence of images 225 containing one or more images to process. This sequence of images may be image data or image bitstreams. For instance this sequence may contain one or more uncompressed images with a representation similar to those used to FIG. 9. The encapsulation process starts by determining the uncompressed image characteristics, or attributes, in a step 1001. The characteristics of the uncompressed bitstream comprise information specifying the content of the image such as the uncompressed format of the input image. This information is provided within the bitstream as a predetermined byte sequence at the beginning of the input bitstream or can be provided as a configuration file of the file writer (the encapsulation module 205). In particular, the characteristics of the input image comprise the number of components present within the image and for each component the number of coded values. Furthermore, it is provided the coding format of each component, typically planar or packed, in addition to the coding pattern of component values used for the image. Colour space information, the number of bits per pixels, or the image size may also be provided during this step 1001.

From the characteristics information of the input bitstream, in a step 1002, the file writer determines the start addresses of each component relatively to the start address of the uncompressed image and stores it in memory. Next, the determination step 1003 links spatial information with component values. Typically for coloured components, it is determined the pixel coordinates of each component value. Again, this information is stored in memory.

Then, the writer generates in a step 1004, generic information on the structure of the uncompressed image that is signalled in different boxes of the media file (e.g. an ISOBMFF-based file). This generic information is a generic representation of the main structures, typically, the components and the values of the components, of an uncompressed or raw image. Several alternative embodiments to signal this information at different locations of the bitstream are proposed. Some of these embodiments are described in reference to FIG. 12.

Finally, in a step 1005, the process encapsulates the generic information describing the uncompressed images from the sequence of images 225 as one or more items with possibly some item properties, item references and/or entity groups in the metadata part of the media file and stores the bytes forming the bitstreams of the different uncompressed images in the media data part of the media file (e.g. a 'mdat' box). Typically, when more than one item are used for one uncompressed image, the encapsulation process may, for example, encapsulate some image components in one item and the remaining components in a different item. According to another example, each component of the image may be encapsulated in its own item.

Figure 11:
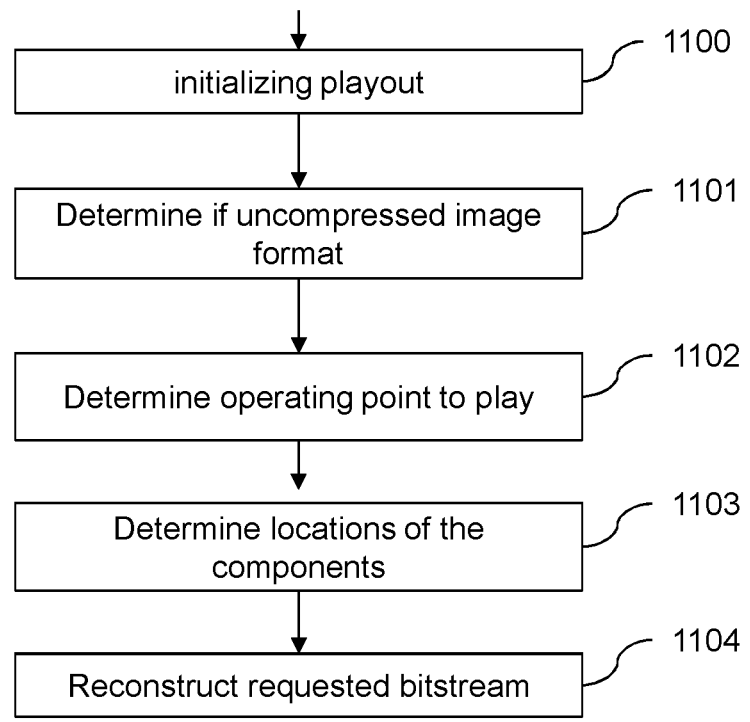

FIG. 11 illustrates an example of the main steps of a parsing process of a media file according to an embodiment of the invention. According to this embodiment, the media file (e.g. the media file 230) contains information specifying a generic representation of an uncompressed image such as the image from FIG. 9a. This parsing process may be handled by a de-encapsulation module like module 215 on FIG. 2. The media file may be an HEIF file, or deriving from HEIF specification like for example a MIAF file.

As illustrated, a first step 1100 is directed to initializing a media player, or media reader, to start reading a media file encapsulated according to some embodiments of the invention. Next, the media player determines, in a step 1101, if the media file content relates to an uncompressed image format, typically by the presence of one or more boxes comprising information that is part of the generic representation of an uncompressed image as generated in a step 1005 of the file writer process, also called encapsulation. For example, the media player inspects the metadata part of the file (e.g. the 'meta' box) and determines whether it contains image items, declared within an 'iinf' box, and further inspects the type of image items present in the media file.

During step 1102, the player determines the operating point requested for the playout. Typically, the operating point is information specifying the expected image to be played. It may be an image item indicated as the primary item of the file. In addition, the operating point may indicate a subset of the components (for example only a luma component to apply some processing or detection algorithm). In yet another alternative, it may also indicate a predetermined spatial area of the image, i.e., a zone in a picture for colour components or a zone for a given component or subset of components. For non-colour component, the component values may also be associated to a spatial portion of the image. This may be determined by parser by inspecting image properties (e.g. the 'ipco' and 'ipma' boxes) or the roles of images (e.g. using 'infe' or 'iref' boxes) or image relationships (e.g. defined in 'iref' boxes or in entity groups).

Based on the information determined in step 1101 and 1102, the media player can identify the set of component values that should be extracted from the media data part of the media file, typically within the 'mdat' container. In a step 1103, the file parser determines from the descriptive metadata boxes that contain information specifying the generic representation of the uncompressed image coding structure, the location, i.e. the byte position or bit address inside the 'mdat' container, of the requested component values.

The final stage 1104 of the media player process consists in forming the reconstructed image bitstream or image data that corresponds to the selected operating point. In particular, the reconstructed image or bitstream may include a subset of the values of the original uncompressed image.

Figure 12:
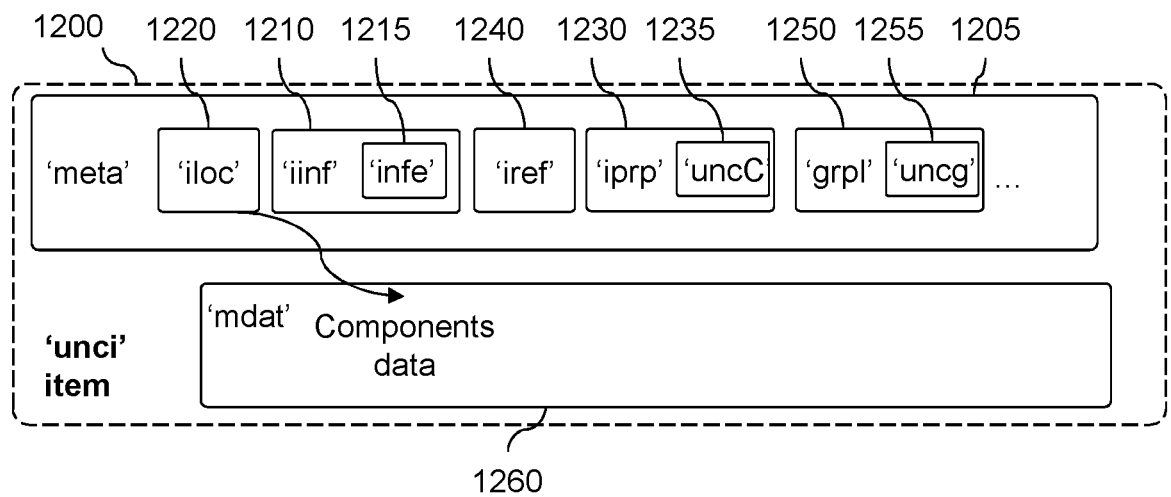

FIG. 12 illustrates an example of media file 1200 according to an embodiment of the invention. In this example, the media file complies with the ISOBMFF standard. It is for example an HEIF file or a file deriving from HEIF specification, for example a MIAF file. The media file 1200 contains an uncompressed image in an 'mdat' data structure 1260 with associated descriptive metadata in a 'meta' data structure 1205. The 'meta' data structure 1205 comprises the description of one or more components of an uncompressed image.

The 'iinf' data structure 1210, the Item Information Box, comprises an 'infe' data structure 1215, an Item Info Entry, that describes the image item. For instance, the 'infe' data structure comprises an 'item_type' field that indicates the type of the item. The type of the item may be set to a value indicating that the image item is represented as an uncompressed image. This value may be for example 'unci' for "uncompressed image" or 'uncv' for "uncompressed video" to indicate uncompressed image item or sequence of images.

The 'iloc' data structure 1220, the Item Location Box, associated to the 'infe' data structure 1215 indicates the location of the image item data. In this example, the image item data is contained in the 'mdat' data structure 1260. In a variant, the image item data may be contained in another data structure, or in another file, or split across several data structures or files.

The 'uncC' data structure 1235, contained in the 'iprp' data structure 1230, is an item property associated with the image item that comprises information on the structure of the uncompressed image. This item property may have a content similar to the 'uncv' data structure 501 or to the 'uncC' box described previously. The 'uncC' four-character code identifying the item property for the description of the components of an uncompressed image is just an example; any other dedicated name (and not conflicting with other registered 4CC) may be used.

The 'uncC' data structure may be defined as an item property as follows:

```
aligned(8) class UncompressedImageConfigurationProperty
extends ItemFullProperty('uncC', version = 0, flags = 0) {
    unsigned int(8) component_count;
```

```
    for (i = 1; i <= component_count; i++) {
        unsigned int(8) component_format[ i ];
    }
    unsigned int(8) component_value_length;
    unsigned int(8) packing_type;
    unsigned int(3) component_sampling_type;
    unsigned int(1) big_endian;
    bit(4) reserved = 0;
}
```

Where component_count indicates the number of components for the associated image item.

component_format[i] specifies the type of the i-th component of the associated image item. The purpose of this field is to describe the content of one of the components comprised in the associated image item. It takes its value in a predefined list of values like the table for the component_format[i] in UncompressedVideoConfigurationRecord. Some specific codes may be allocated for proprietary or vendor-specific component types.

component_value_length indicates the length in bits of the component values of the associated image item.

packing_type indicates the type of packing format used for the components of the associated image item. It may take its values from a predefined list like the table for the packing_type syntax element in UncompressedVideoConfigurationRecord.

component_sampling_type indicates the sampling type of the components (e.g. 4:2:0, 4:2:2; 4:4:4 . . . ) if any. Otherwise, it shall be equal to 0 or may be omitted.

big_endian indicates when set to 0 that the component values are stored using little-endian order. When equal to 1, it states that the values are stored using big-endian order. When the component_value_length is lower than eight, the value of this flag should be set to 0.

The "essential" parameter in the 'ipma' box may be set to 1 for an 'uncC' item property associated with an image item of type 'unci' or 'uncv' (or using the dedicated 4CC for uncompressed images). This indicates to parsers that this property is essential (it should be understood and parsed) to process the associated item.

Possibly the information on the structure of the uncompressed image may be described by several item properties. For example, a first item property may describe the number of components, their respective formats, the length of their values and whether they use a big_endian storage or not, a second item property may describe the packing of these components and a third item property may describe the sampling of the components. These properties are associated (e.g. in 'ipma' box) to the image item describing the uncompressed image (e.g. with item type 'unci' or 'uncv' or dedicated 4CC for uncompressed image items).

In this example, all the components of the uncompressed image are stored jointly inside a same item.

In another example, the components of the uncompressed image are stored in separate items, for example one for each component. An entity to group box with the grouping_type 'uncg' 1255 contained in the 'grpl' data structure 1250 (the Group List Box) may then be defined to group all the items containing components of an uncompressed image. In this example, the 'uncC' item property 1235 may be associated with the entity to group box of type 'uncg' 1255 to describe the components of the uncompressed image. The index in the loop on the components in the 'uncC' property 1235 corresponds to the index of the items contained in the entity group 1255. The items containing the components are listed inside the 'uncg' entity to group box 1255 in the same order as they are described inside the 'uncC' item property 1235. In this example, there is one item for each component of the uncompressed image and the number of component_count in the 'uncC' property 1235 is equal to the num_entities_in_group's value in the associated entity group 1255. In this example, some items containing some components of the uncompressed image may be indicated as hidden images. For example, when some components correspond to RGB components, they may be visible and selectable images while a disparity component or infra-red component or any other component not suitable for being displayed alone may be indicated as an hidden image. An item containing a component of an uncompressed image may have its item_type set to 'uncc' for uncompressed component, or to 'unci' or to another dedicated type indicating a component of an uncompressed image item.

In a variant of this example, the description of the components of the uncompressed image is contained in the 'uncg' entity to group box itself.

In another variant of this example, the item property associated with the entity to group box describes the properties common to all the components of the uncompressed image, for instance the packing and the sampling of the components. Additional items properties may be associated to the items containing the different components, each additional item property describing the characteristics of the component contained in an item. For instance, these additional items properties may describe the format of the component, the length of its value and whether it uses a big_endian storage or not.

In another example, the components of the uncompressed image are stored in separate items, one for each component, called image component items. Another item, the uncompressed image item, is used for representing the uncompressed image itself. This item may be of type 'uncb' identifying a "base" uncompressed image item. The 'uncC' property 1235 is associated with the uncompressed image item. The image component items may be associated with the uncompressed image item using a reference of type 'uncc' inside the 'iref' data structure 1240, the Item Reference Box. The reference goes from the uncompressed image item to the image component items, listing the items containing the components in the same order as they are described inside the 'uncC' data structure 1235. In this example, there is one image component item for each component of the uncompressed image. Preferably in this example, the image component items are described as hidden images. The uncompressed image item may be of type (item_type) 'uncb', or of type 'unci' or another dedicated type. The reference from the uncompressed image item to the image component items may be of type 'uncc', or of type 'unci' or another dedicated item reference type.

In a variant of this example, the data structure describing the components of an uncompressed image is not indicated inside a 'uncC' item property, but as part of the data of the 'uncb' uncompressed image item.

In another variant of this example, the uncompressed image item is declared as a derived image item with a specific item_type, for example 'uncb' for uncompressed base item and with a 'dimg' reference type to the image component items. The data structure (like 1235) describing the components may be stored as the payload of the derived image item, for example in the data part of the file. Alternatively to the 'dimg' reference type, a specific item reference type may also be used (for example 'uncc') to indicate that the derived item consists in reconstruction of an uncompressed image from one or more image component items.

In another variant of this example, the item property associated to the uncompressed image describes the properties common to all the components of the uncompressed image, for instance the packing and the sampling of the components. Additional items properties may be associated to the image component items, each additional item property describing the characteristics of the component contained in an item. For instance, these additional items properties may describe the format of the component, the length of its value and whether it uses a big_endian storage or not.

Possibly, several components of the uncompressed image may be stored in one item while another component is stored in another item. For example, these several components may be YUV components or RGB components while the another component is a depth component or an alpha channel component. In this case, the item storing several components has an associated 'uncC' item property describing the components stored inside it. An item containing several components of an uncompressed image may have the item type 'uncs', or 'uncc', or 'unci' or another item type. Possibly, the item property associated to the item containing several components of an uncompressed image may contain only the information specific to these components, for instance the number of components and their formats.

As an alternative, several components of the uncompressed image may be stored in one uncompressed image item while another component is stored in an auxiliary item. For example, the several components may be YUV components or RGB components while the other component is a depth component or an alpha channel component. Auxiliary items may be associated with the uncompressed image item using an item reference of type 'auxl' from the auxiliary image item to the uncompressed image item. An auxiliary image item may be associated with an AuxiliaryTypeProperty as defined in ISO/IEC 23008-12 providing a URN identifying the type of the auxiliary image (e.g. "urn:mpeg:mpegB:cicp:systems:auxiliary:alpha" for an alpha channel component, or "urn:mpeg:mpegB:cicp:systems:auxiliary:depth" for a depth map component). Other URNs may be defined to identify other types of auxiliary components.

Possibly, an item, the uncompressed image item, may contain one or more components and be associated with other items, the component items, containing one or more components. The uncompressed image item may be associated with the component items either through a 'uncg' entity to group box, or through an item reference of type 'uncc'. The respective components contained in the uncompressed image item and in the component items may be described by the respective 'uncC' item properties associated with each item. Possibly, if a 'uncg' entity to group box is used to associate the uncompressed image item with the component items, a 'uncC' item property may be associated with the 'uncg' entity to group box to describe all the components contained in the items grouped by the 'uncg' entity to group box. In a variant of this case, the 'uncC' item properties associated with the different items may contain a partial description of the components contained in the item they are associated with. For example, they may contain only the number of components contained in the item they are associated with. In another variant of this case, no 'uncC' item properties are associated with the different items and the 'uncC' item property associated with the 'uncg' entity to group box contains the number of components of each item contained in the group.

Possibly, the association of an uncompressed image item with image component items through an item reference of type 'uncc' may describe two different uncompressed images. A first uncompressed image is composed only of the components contained in the uncompressed image item. A second uncompressed image is composed of the components contained in the uncompressed image item and of those contained in the component items. Possibly, a different type of item reference, for example 'unco', may be used to indicate that the components contained in the component items referenced by the 'unco' item reference may be ignored while reconstructing the uncompressed image.

Possibly, at reconstruction step 1102, when the player determines that there is an item reference of type 'uncc' in the media file, it may determine whether to use only the components contained in the item that is at the origin of the item reference or to use both the components contained in the item at the origin of the item reference and those contained in the referenced items. In the latter case, the components are ordered according to the ordering of the items inside the 'uncc' item reference. If there are several item references of type 'uncc' originating from the same item in the media file, the player may determine to select one of these references, several of these references or none of them Possibly, the grouping of an uncompressed image item with component items inside a 'uncg' entity to group box may describe two different uncompressed images. A first uncompressed image is composed only of the components contained in the uncompressed image item. A second uncompressed image is composed of the components contained in the uncompressed image item and of those contained in the component items. Possibly, a different type of entity to group box, for example 'unco' may be used to indicate that the components contained in the component items contained in the group may be ignored while reconstructing the uncompressed image. Possibly, the uncompressed image item and the component items may be distinguished inside the 'uncg' group by their item type. Possibly, they may be distinguished by their position inside the group, the first item being an uncompressed image item and the other items being component items.

Possibly, at reconstruction step 1102, when the player determines that there is an entity to group box of type 'uncg' inside the media file, it may determine whether to use only the components contained in the uncompressed image item or to use both the components contained in the uncompressed image item and those contained in the component items. If there are several 'uncg' groups inside the media file, the player may determine to use any of those groups to obtain the components of the uncompressed image to be reconstructed.

Possibly, if the uncompressed image data stored in the 'mdat' data structure 1260 contains some header and/or trailer, the 'iloc' data structure may indicate the location of the part of the uncompressed image data corresponding only to component data and not the location of the whole uncompressed image data (for example using extents in ItemLocationBox 'iloc'). Similarly, if the uncompressed image data uses a planar packing type, and some component data contains some header and/or trailer, the 'iloc' data structure may indicate the location of the parts of the uncompressed image data corresponding only to component data and not the location of the whole uncompressed image data (for example using extents in ItemLocationBox 'iloc').

As another example, an uncompressed image may contain one or more components corresponding to the output of a Bayer filter. In this example, the 'uncC' data structure may be defined as follows:

```
aligned(8) class UncompressedImageConfigurationProperty
extends ItemFullProperty('uncC', version = 0, flags = 0) {
    unsigned int(8) component_count;
    for (i = 1 ; i <= component_count ; i++) {
        unsigned int(8) component_format[i];
    }
    unsigned int(8) component_value_length;
    unsigned int(8) packing_type;
    unsigned int(8) bayer_filter_type;
    unsigned int(3) component_sampling_type;
    unsigned int(1) big_endian;
    bit(4) reserved = 0;
}
```

In this example, the value 'b' may be used for the component_format syntax element to indicate that a component corresponds to the output of a Bayer filter. The bayer_filter_type syntax element may be used to define the structure of the Bayer filter, with the value 0 indicating that no component corresponds to the output of a Bayer filter. The presence of the bayer_filter_type syntax element may be controlled by checking whether one of the component_format values corresponds to a Bayer component or not (if yes, the syntax element is present; if not the syntax element may be omitted). Alternatively, the type of the Bayer filter is described through the packing_type parameter by extending the Table described in relation to UncompressedvideoconfigurationRecord with additional values representing different structures of Bayer filters. Other embodiments may be used to describe components of an uncompressed image that correspond to the output of a Bayer filter.

In all these examples and embodiments, the information on the structure of the uncompressed image may be contained in one or more item properties, item data or entity to group contents. The item properties may be associated with the same or different items or entity to groups. Existing image properties (e.g. 'pixi', 'pasp', 'rloc' . . . ) may be associated to uncompressed image items or image component items.

As another example, a media file may contain an uncompressed image item corresponding to a grid or to an overlay of uncompressed images or to a transformed version of an uncompressed image. As another example, a media file may contain an uncompressed image item as an alternative version to a coded (or compressed) version of an image, like for example an HEVC or VVC image item (resp 'hvc1' or 'vcc1' item type).

Figure 6:
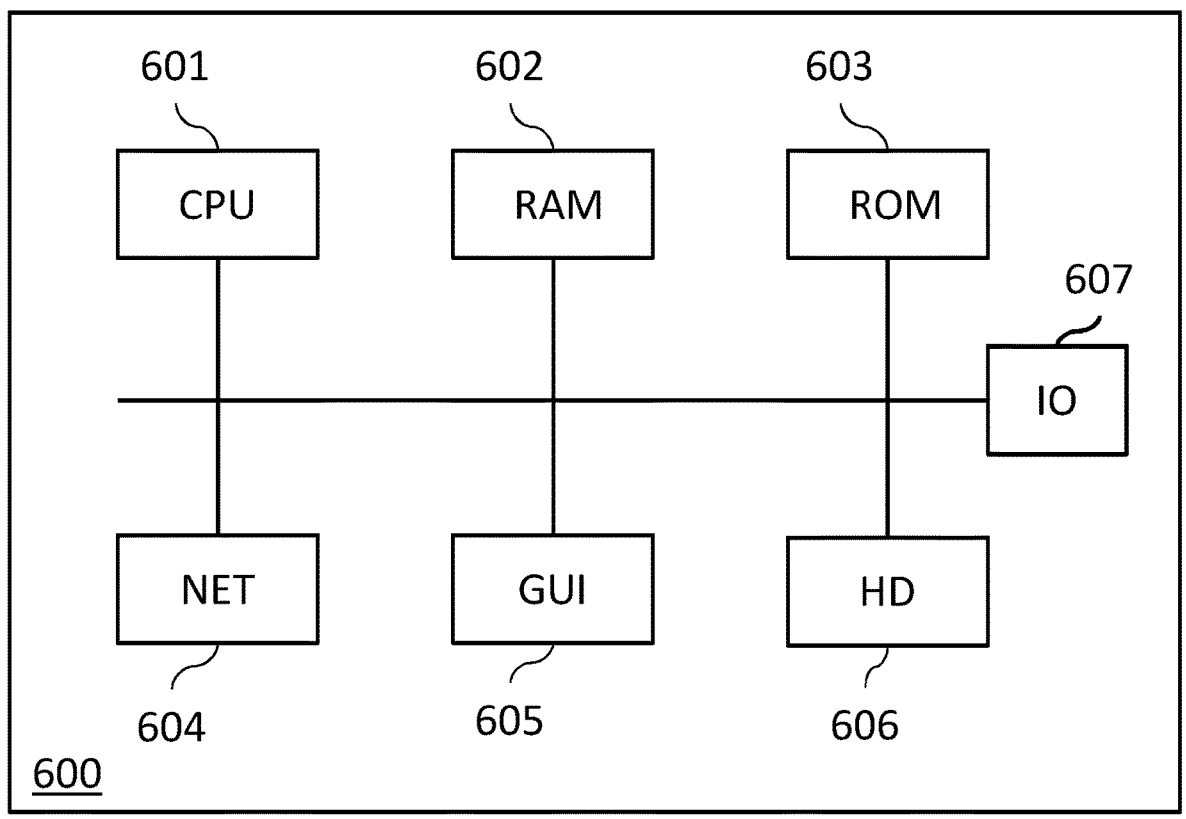
FIG. 6 is a schematic block diagram of a computing device for implementation of one or more embodiments of the invention.

FIG. 6 is a schematic block diagram of a computing device 600 for implementation of one or more embodiments of the invention. The computing device 600 may be a device such as a micro-computer, a workstation or a light portable device. The computing device 600 comprises a communication bus connected to:

- a central processing unit 601, such as a microprocessor, denoted CPU;
- a random access memory 602, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;

a read only memory 603, denoted ROM, for storing computer programs for implementing embodiments of the invention;

a network interface 604 is typically connected to a communication network over which digital data to be processed are transmitted or received. The network interface 604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 601;

a graphical user interface 605 may be used for receiving inputs from a user or to display information to a user;

a hard disk 606 denoted HD may be provided as a mass storage device;

an I/O module 607 may be used for receiving/sending data from/to external devices such as a video source or display.

The executable code may be stored either in read only memory 603, on the hard disk 606 or on a removable digital medium such as for example a disk. According to a variant, the executable code of the programs can be received by means of a communication network, via the network interface 604, in order to be stored in one of the storage means of the communication device 600, such as the hard disk 606, before being executed.

The central processing unit 601 is adapted to control and direct the execution of the instructions or portions of software code of the program or programs according to embodiments of the invention, which instructions are stored in one of the aforementioned storage means. After powering on, the CPU 601 is capable of executing instructions from main RAM memory 602 relating to a software application after those instructions have been loaded from the program ROM 603 or the hard-disc (HD) 606 for example. Such a software application, when executed by the CPU 601, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method performed by a processor of a computing device for encapsulating an uncompressed video sequence in an International Organization for Standardization Base Media File Format (ISOBMFF) based media file, the uncompressed video sequence comprising uncompressed samples, wherein the method comprises:
generating a track comprising description information describing the samples of the uncompressed video sequence and comprising a sample entry indicating that the samples are uncompressed, wherein the sample entry comprises sample configuration information indicating a number of components in the uncompressed samples, a component having a plurality of component values, the sample configuration information further comprising:
an indication of the sampling type of a component,
an indication of the interleaving of component values into sample data, and
for each component, a component type of the component and an indication indicating the size in bits of the plurality of component values of the component; and
generating the media file including the generated track, and the uncompressed video sequence,
wherein the sample configuration information enables a processing device to process at least a part of the sample data.

2. The method of claim 1, wherein the description information further comprises the width and height of the uncompressed samples.

3. The method of claim 1, wherein the sample configuration information further comprises an indication whether a row of a component contains padding data.

4. The method of claim 1, wherein the indication of the sampling type indicates the sampling of the plurality of component values of a component relatively to width and height of a reference component.

5. The method of claim 1, wherein the sample configuration information further comprises:
a prefix description information comprising an indication whether the sample data comprises a prefix, and if the sample data comprises a prefix the size of the prefix; and
a suffix description information comprising an indication whether the sample data comprises a suffix, and if the sample data comprises a suffix the size of the suffix.

6. The method of claim 1, wherein the sample configuration information further comprises for at least one component:
a prefix description information comprising an indication whether the component data comprises a prefix, and if the component data comprises a prefix the size of the prefix; and
a suffix description information comprising an indication whether the component data comprises a suffix, and if the component data comprises a suffix the size of the suffix.

7. The method of claim 1, wherein the sample configuration information further comprises for each component an indication whether the component is a coloured component.

8. The method of claim 1, wherein the sample configuration information further comprises for each component an indication whether the component is an essential component.

9. The method of claim 1, wherein the description information is stored in a SampleEntry box or in a SampleGroupDescriptionEntry box and the uncompressed video sequence is stored in a 'mdat' box.

10. The method of claim 1, wherein the description information comprises for at least one component a pattern information indicating a bit-mapping of a set of component values on a set of bytes.

11. The method of claim 1,
wherein the description information comprises for at least one component a disparity information indicating disparity parameters for a disparity component.

12. The method of claim 1,
wherein the description information comprises for at least one component a depth information indicating depth parameters for a disparity or depth component.

13. The method of claim 1,
wherein the description information comprises for at least one component a chroma location information indicating a chroma location for a component.

14. The method of claim 1,
wherein the description information comprises for at least one component an interlacing information indicating how the content of a component is interlaced.

15. The method of claim 1,
wherein the description information comprises for at least one component a frame packing information indicating how frames are packed in a sample.

16. The method of claim 1, wherein the indication of interleaving of component values indicates ordering of pixels and/or component values within the sample data.

17. The method of claim 1, wherein the indication of the interleaving of component values can be one of:
a mix between (i) all component values per component and (ii) per component values, depending on the component type, and
per row of component values.

18. A method performed by a processor of a computing device for reading an International Organization for Standardization Base Media File Format (ISOBMFF) based media file comprising an uncompressed video sequence, the uncompressed video sequence comprising uncompressed samples, wherein the method comprises
obtaining, from the media file, a track comprising description information describing the samples of the uncompressed video sequence and comprising a sample entry indicating that the samples are uncompressed, wherein the sample entry comprises sample description information indicating a number of components in the uncompressed samples, a component having a plurality of component values, the sample configuration information further comprising:
an indication of the sampling type of a component,
an indication of the interleaving of component values into sample data, and
for each component, a component type of the component and an indication indicating the size in bits of the plurality of component values of the component;
reading, from the media file, the uncompressed video sequence based on the description information and the sample configuration information in the track.

19. A non-transitory computer-readable storage medium storing instructions of a computer program for implementing a method according to claim 1.

20. A device for encapsulating an uncompressed video sequence in an International Organization for Standardization Base Media File Format (ISOBMFF) based media file, the uncompressed video sequence comprising uncompressed samples, wherein the device comprises a processor configured for:
generating a track comprising description information describing the samples of the uncompressed video sequence and comprising a sample entry indicating that the samples are uncompressed, wherein the sample entry comprises sample configuration information indicating a number of components in the uncompressed samples, a component having a plurality of component values, the sample configuration information further comprising:
an indication of the sampling type of a component,
an indication of the interleaving of component values into sample data, and
for each component, a component type of the component and an indication indicating the size in bits of the plurality of component values of the component;
generating the media file including the generated track and the uncompressed video sequence,
wherein the sample configuration information enables a processing device to process at least a part of the sample data.

21. A device for reading an International Organization for Standardization Base Media File Format (ISOBMFF) based media file comprising an uncompressed video sequence, the uncompressed video sequence comprising uncompressed samples, wherein the device comprises a processor configured for:
obtaining, from the media file, a track comprising description information describing the samples of the uncompressed video sequence and comprising a sample entry indicating that the samples are uncompressed, wherein the sample entry comprises sample configuration information indicating a number of components in the uncompressed samples, a component having a plurality of component values, the sample configuration information further comprising:
an indication of the sampling type of a component,
an indication of the interleaving of component values into sample data, and
for each component, a component type of the component and an indication indicating the size in bits of the plurality of component values of the component;
reading, from the media file, the uncompressed video sequence based on the description information and the sample configuration information in the track.

* * * * *